United States Patent
Wood et al.

(10) Patent No.: US 9,281,770 B2
(45) Date of Patent: Mar. 8, 2016

(54) PRECISION-FASTENING HANDHELD CORDLESS POWER TOOLS

(71) Applicant: Ingersoll-Rand Company, Davidson, NC (US)

(72) Inventors: Michael R. Wood, Randolph, NJ (US); William M. Ball, Jr., Stockton, NJ (US); Christopher John Taylor, Elmira, NY (US)

(73) Assignee: Ingersoll-Rand Company, Davidson, NC (US)

( * ) Notice: Subject to any disclaimer, the term of this patent is extended or adjusted under 35 U.S.C. 154(b) by 9 days.

(21) Appl. No.: 13/739,315

(22) Filed: Jan. 11, 2013

(65) Prior Publication Data

US 2013/0193891 A1  Aug. 1, 2013

Related U.S. Application Data

(60) Provisional application No. 61/591,468, filed on Jan. 27, 2012, provisional application No. 61/617,502, filed on Mar. 29, 2012, provisional application No. 61/636,873, filed on Apr. 23, 2012.

(51) Int. Cl.
*H02P 7/00* (2006.01)
*H02K 23/68* (2006.01)
*H02P 7/06* (2006.01)
(Continued)

(52) U.S. Cl.
CPC ... *H02P 7/06* (2013.01); *B25F 5/00* (2013.01); *H02P 6/08* (2013.01)

(58) Field of Classification Search
USPC .......... 318/272, 727, 400.04, 430, 434, 318/400.18; 81/483, 478; 388/937; 700/168; 307/150; 173/2, 170; 363/21.01

See application file for complete search history.

(56) References Cited

U.S. PATENT DOCUMENTS 4,397,196 A * 8/1983 Lemelson .................. 73/862.23
4,510,656 A   4/1985 Yoshida et al.
(Continued)

FOREIGN PATENT DOCUMENTS

CN  1105614 A   7/1995
CN  101171101 A  4/2008
(Continued)

OTHER PUBLICATIONS

International Search Report and Written Opinion for Corresponding PCT Application No. PCT/US2013/022541, date of mailing May 8, 2013.
(Continued)

*Primary Examiner* — Paul Ip
(74) *Attorney, Agent, or Firm* — Sunstone IP

(57) ABSTRACT

Cordless power tools include a pistol housing having an upper portion that merges into a downwardly extending handle, a DC motor residing in the upper portion of the housing, the DC motor having a rotor that drives an output shaft; a torque transducer on board the tool in communication with the output shaft; and a dynamic motor control circuit residing in the housing in communication with the motor and torque transducer. The dynamic motor control circuit includes a Kelvin resistor in communication with the motor for measuring motor current and digital hall switches in communication with the motor for measuring motor speed. The motor current can vary by at least 100 A during operation.

20 Claims, 30 Drawing Sheets

(51) Int. Cl.
*H02P 6/08* (2006.01)
*B25F 5/00* (2006.01)

(56) References Cited

U.S. PATENT DOCUMENTS

| | | | |
|---|---|---|---|
| 4,571,696 A | 2/1986 | Bitzer | |
| 5,014,793 A | 5/1991 | Germanton et al. | |
| 5,399,959 A | 3/1995 | Konigbauer et al. | |
| 5,440,215 A | 8/1995 | Gilmore | |
| 5,495,154 A * | 2/1996 | Carobolante | 318/400.04 |
| 5,563,482 A * | 10/1996 | Shaw et al. | 318/272 |
| 6,172,860 B1 * | 1/2001 | Yoshimizu et al. | 361/25 |
| 6,489,742 B2 * | 12/2002 | Lumsden | 318/727 |
| 6,495,932 B1 * | 12/2002 | Yoshimizu et al. | 307/150 |
| 6,536,536 B1 | 3/2003 | Gass et al. | |
| 6,683,396 B2 | 1/2004 | Ishida et al. | |
| 6,836,614 B2 | 12/2004 | Gilmore | |
| 6,981,436 B2 * | 1/2006 | Becker et al. | 81/479 |
| 7,031,855 B2 * | 4/2006 | Mottola | 702/64 |
| 7,112,934 B2 | 9/2006 | Gilmore | |
| 7,121,358 B2 | 10/2006 | Gass et al. | |
| 7,160,132 B2 | 1/2007 | Phillips et al. | |
| 7,196,911 B2 * | 3/2007 | Takano et al. | 363/21.01 |
| 7,331,406 B2 | 2/2008 | Wottreng, Jr. et al. | |
| 7,411,400 B2 * | 8/2008 | Averbuch | 324/433 |
| 7,420,341 B2 | 9/2008 | Glasgow et al. | |
| 7,458,297 B1 * | 12/2008 | Shiao | 81/483 |
| 7,471,016 B2 | 12/2008 | Stoicescu et al. | |
| 7,498,526 B2 | 3/2009 | Lohr et al. | |
| 7,540,220 B2 * | 6/2009 | Shiao | 81/478 |
| 7,619,387 B2 | 11/2009 | Amend et al. | |
| 7,638,958 B2 | 12/2009 | Phillipp et al. | |
| 7,791,302 B2 | 9/2010 | Krause et al. | |
| 7,795,829 B2 | 9/2010 | Seiler et al. | |
| 7,816,888 B2 | 10/2010 | Rejman et al. | |
| 7,928,845 B1 | 4/2011 | LaRosa | |
| 7,936,140 B2 | 5/2011 | Wei | |
| 7,940,025 B2 | 5/2011 | Duesselberg | |
| 7,952,333 B2 * | 5/2011 | Heppenstall | 323/269 |
| 8,381,829 B2 * | 2/2013 | Hanawa et al. | 173/2 |
| 2002/0033267 A1 | 3/2002 | Schweizer et al. | |
| 2002/0079859 A1 * | 6/2002 | Lumsden | 318/727 |
| 2003/0094081 A1 * | 5/2003 | Becker et al. | 81/479 |
| 2003/0182016 A1 * | 9/2003 | Fiebig et al. | 700/168 |
| 2005/0013144 A1 * | 1/2005 | Takano et al. | 363/21.01 |
| 2005/0126351 A1 * | 6/2005 | Becker et al. | 81/479 |
| 2005/0205274 A1 * | 9/2005 | Bogue | 173/2 |
| 2005/0283325 A1 * | 12/2005 | Mottola | 702/64 |
| 2007/0229027 A1 | 10/2007 | Roehm et al. | |
| 2008/0113262 A1 | 5/2008 | Phillips et al. | |
| 2008/0134845 A1 * | 6/2008 | Shiao | 81/479 |
| 2008/0179078 A1 | 7/2008 | Opsitos | |
| 2008/0191779 A1 * | 8/2008 | Heppenstall | 327/427 |
| 2008/0257577 A1 | 10/2008 | Tanaka et al. | |
| 2009/0101379 A1 | 4/2009 | Du et al. | |
| 2009/0107306 A1 * | 4/2009 | Shiao | 81/479 |
| 2009/0108806 A1 * | 4/2009 | Takano et al. | 320/112 |
| 2009/0277313 A1 * | 11/2009 | Wise | 81/474 |
| 2010/0221589 A1 | 9/2010 | Friedli et al. | |
| 2010/0252287 A1 | 10/2010 | Morimura et al. | |
| 2010/0265097 A1 * | 10/2010 | Obatake et al. | 340/870.4 |
| 2010/0277014 A1 | 11/2010 | Hicks | |
| 2010/0314147 A1 | 12/2010 | Muller et al. | |
| 2012/0262035 A1 * | 10/2012 | Takano et al. | 310/68 R |
| 2012/0292067 A1 * | 11/2012 | Velderman et al. | 173/170 |
| 2012/0293099 A1 * | 11/2012 | Velderman et al. | 318/400.18 |
| 2013/0154549 A1 * | 6/2013 | Hanawa et al. | 320/107 |

FOREIGN PATENT DOCUMENTS

| | | |
|---|---|---|
| CN | 101890691 A | 11/2010 |
| CN | 102029586 A | 4/2011 |
| EP | 0633096 A1 | 1/1995 |
| JP | 2011-31314 A | 2/2011 |
| WO | WO2012/134474 | 10/2012 |

OTHER PUBLICATIONS

International Preliminary Report on Patentability dated Jul. 29, 2014 from International Patent Application No. PCT/US2013/022541 filed Jan. 22, 2013.

Office Action dated Oct. 8, 2015 from Chinese Patent Application No. 201310028215.X.

Search Report dated Jul. 30, 2015 from Chinese Patent Application No. 201310028215.X.

* cited by examiner

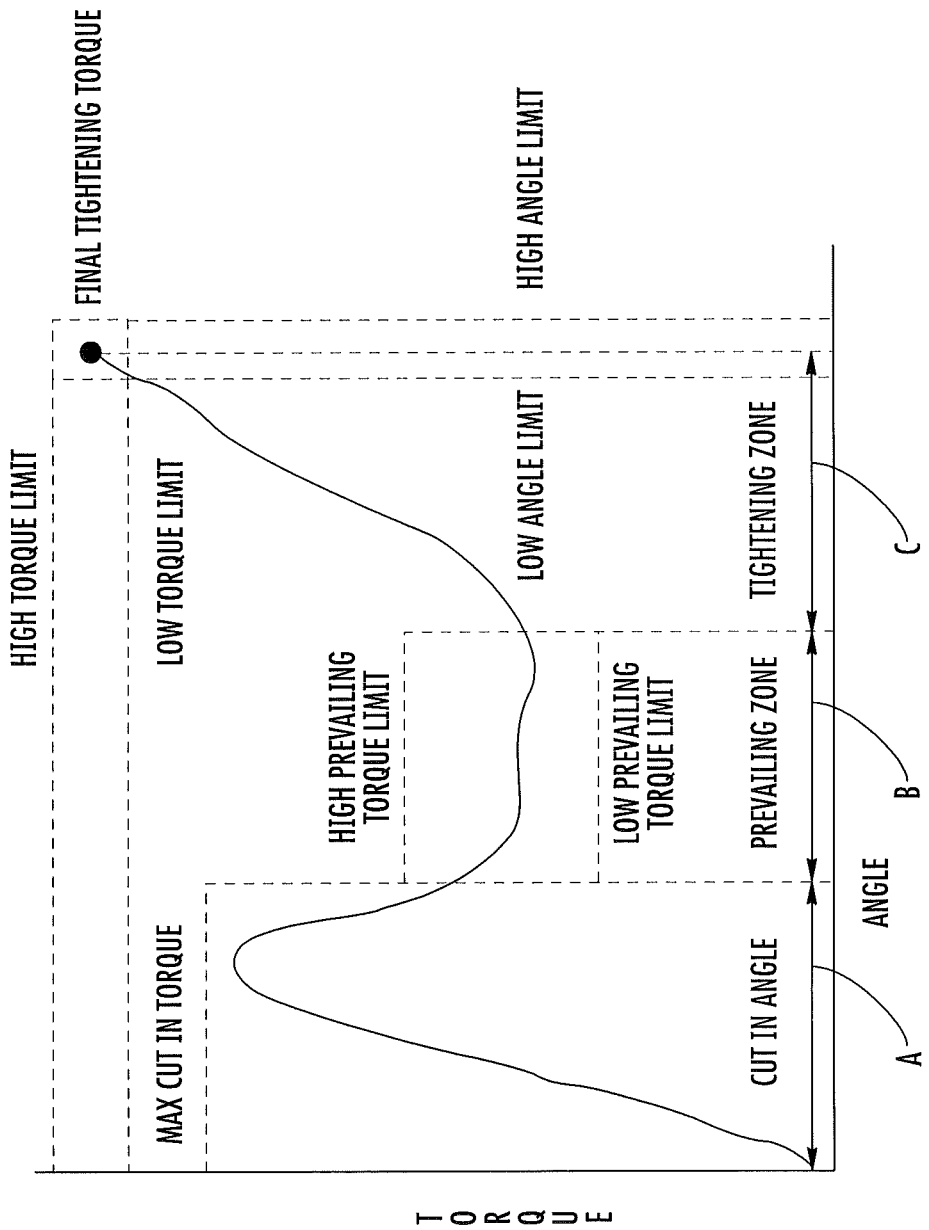

ACTIVE FAULT SCREEN

FIRST SINGLE DIGIT INDICATES FAULT TYPE, LAST 2 DIGITS
INDICATE FAULT CODE RELATED TO TYPE. THIS SCREEN IS THE
VERSION OF DISPLAY THAT POPS UP WHEN THE FAULT OCCURS.
PRESSING THE ENTER BUTTON SIMPLY ACKNOWLEDGES THE FAULT.

EDIT MODE EXAMPLES

DISPLAY ALLOWING EDITS WILL BE INVERSE VIDEO WHEN THE TOOL
IS IN EDIT MODE. IN ADDITION THERE WILL BE A CURSOR TO ASSIST
THE USER IN EDITING VALUES WITH ALPHA-NUMERIC CHARACTERS
WHICH WILL BE MAINPULATED USING UP AND DOWN ARROW BUTTONS.

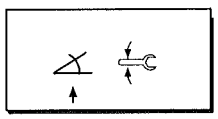

SOME DISPLAYS USE AN ARROW TO CHOOSE BETWEEN SELECTIONS.
THE SELECTION IS MANIPULATED BY THE USER PRESSING THE RIGHT
AND LEFT ARROW BUTTONS

FIG. 17A

PRIMARY SATUS DISPLAY IN ORDER USING DOWN BUTTON

 PRIMARY TOOL STATUS

 TORQUE TARGET CONFIGURATION SCREEN

 ANGLE TARGET CONFIGURATION SCREEN

 CURRENT CYCLE COUNT (EDITABLE HERE)

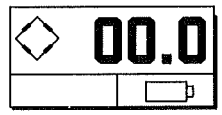 TOOL DIAGNOSTIC DISPLAY

 CURRENT ACTIVE FAULT CODE (BLANK IN NO-FAULT CONDITION)

 TOOL PASSWORD DISPLAY (EDITABLE HERE TO UNLOCK TOOL)

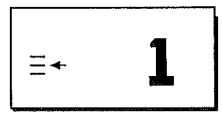 CONFIGURATION SELECTION SCREEN (EDITABLE HERE)

USE UP AND DOWN ARROWS TO NAVIGATE THIS LIST. SCREENS WRAP AROUND SUCH THAT PRESSING THE UP ARROW ON THE PRIMARY TOOL STATUS DISPLAY LEADS TO CONFIGURATION SELECTION SCREEN

FIG. 17B

ON-TOOL SETUP DISPLAY ON TOOL (ALL DISPLAYS ARE EDITABLE)

TIGHTENING STRATEGY SECTION

FORWARD DIRECTION SELECTION (COUNTER CLOCKWISE/CLOCKWISE)

TORQUE UNIT SELECTION

TARGET ENTRY SCREEN

HIGH TORQUE LIMIT

LOW TORQUE LIMIT

HIGH ANGLE LIMIT

LOW ANGLE LIMIT

SHIFTDOWN TORQUE VALUE

USE UP AND DOWN ARROWS TO NAVIGATE THIS LIST. SCREENS WRAP AROUND SUCH THAT PRESSING THE UP ARROW ON THE TIGHTENING STRATEGY SECTION DISPLAY LEADS TO SAVE SETUP SCREEN

PRECISION-FASTENING HANDHELD CORDLESS POWER TOOLS

RELATED APPLICATIONS

This patent application claims the benefit of and priority to U.S. Provisional Patent Application Ser. No. 61/591,468 filed Jan. 27, 2012, U.S. Provisional Patent Application Ser. No. 61/617,502 filed Mar. 29, 2012, and U.S. Provisional Patent Application Ser. No. 61/636,873 filed Apr. 23, 2012, the contents of which are hereby incorporated by reference as if recited in full herein.

FIELD OF THE INVENTION

This invention relates to power tools and is particularly suitable for cordless power tools.

BACKGROUND OF THE INVENTION

Monitoring torsion in power tools and other rotating machinery is often desirable. In the case of corded power tools, such as nutrunners or screwdrivers, the monitored data permits measurement of the rotational torque output and thereby calculation of output produced by the tool. However, there are serious technical challenges in implementing a robust, economical battery-powered (cordless) power tool, particularly for precision uses. A battery operated tool is low in voltage and therefore, to be sufficiently powerful, operates with high current and/or high power density. In addition, the compact nature of a hand-held cordless power tool, coupled with the fast-changing high currents and economic cost goals, present significant circuit reliability challenges, including signal and/or noise interference, dynamic motor control issues, and thermal management challenges.

SUMMARY OF EMBODIMENTS OF THE INVENTION

Embodiments of the invention are directed to cordless, precision handheld power tools with an on-board closed loop dynamic control circuit that measures torque directly and provides accurate current and motor position data for precision fastening-control output.

Embodiments of the invention employ a four wire Kelvin resistor for reliable current measurement.

Some embodiments are directed to cordless power tools that include: a pistol housing having an upper portion that merges into a downwardly extending handle; a DC motor residing in the upper portion of the housing, the DC motor having a rotor that drives an output shaft; a torque transducer on board the tool in communication with the output shaft; and a dynamic motor control circuit residing in the housing in communication with the motor and torque transducer. The dynamic motor control circuit includes a Kelvin resistor in communication with the motor for measuring motor current and digital hall switches in communication with the motor for measuring motor speed. The motor current can vary by at least 100 A during operation.

The power tool handle can have a lower portion that engages a releasable and rechargeable battery pack. The tool can include the battery pack attached to the lower portion of the power tool and the battery pack can be a low voltage battery pack of about 36V or less.

The Kelvin resistor is a four terminal device with two terminals used for current sensing and two used as a current path. The dynamic motor control circuit is configured to run the motor using current that is switched between about 150 A to about −150 A.

The power tool can include a power circuit board (typically part of the motor control circuit) residing in the handle that holds the Kelvin resistor. The power circuit board further includes at least one high gain differential current amplifier and a plurality of low-inductance 3-node capacitors mounted proximate to the high gain amplifier(s) power input (e.g., on a power circuit board) to block or reduce external EMI and/or other signal interference.

The cordless power tool can also include: a trigger circuit board residing under the motor in the housing; a processor circuit board residing in a lower portion of the handle in communication with the trigger circuit; and a power circuit board residing between the trigger circuit board and the processor circuit board in communication with the processor circuit. The power circuit board can have a length that is greater than a major portion of a length of the handle. The power circuit board can include a plurality of spaced apart integral heat sinks board residing on both primary surfaces of the power circuit board, each integral heat sink including a volume of a thermally conductive material in a respective defined fill area of the circuit.

The cordless power tool can include switching devices in communication with the motor, the switching devices comprising switching elements that are mounted directly across from each other on opposing primary surfaces of the power circuit board to thereby reduce radiated emissions and/or generated heat.

The cordless power tool can include a power circuit board residing in the handle, wherein the power circuit board has a length that is greater than a major portion of a length of the handle, the power circuit board can include motor drive circuits. The tool can include a cooling air flow path that comprises at least one air intake proximate the bottom of the handle. The air flow path can be configured to direct air to flow over the power circuit board to a top portion of the tool before exhausting out of the housing via exhaust ports on an upper portion of the housing.

The cordless power tool can include a processor circuit board residing in a lower part of the housing in a substantially horizontal orientation substantially orthogonal to the power board. The processor circuit comprises wires that are routed proximate an inner surface of the handle housing wall over one primary surface of the power board to the upper portion of the housing.

The dynamic motor control circuit can be a closed loop control circuit held in the housing to provide precise torque output. The closed loop control circuit can include a power circuit board in communication with the motor held in the handle. The power circuit board can have switching devices. The motor can have a dynamic range of between about −150 A to about +150 A and the closed loop control circuit can control the motor current to a resolution of at least about 0.1 A.

The power tool can be a precision-fastening power tool. The power circuit board can be elongated with a height that is substantially the same as a length of the handle with a lower portion that includes a battery interface. The power circuit board has first and second primary surfaces that reside upright in the handle portion with longitudinally spaced apart integral metallic heat sinks on each of the first and second primary surfaces, and with switching elements for respective switching devices mounted on top of each heat sink directly across from each other.

The power circuit board can include high gain differential current amplifiers. The power circuit board can include first and second power switch elements residing substantially directly across from each other on opposing primary sides of the power circuit board.

The power circuit board can be separate from all digital circuits to thereby isolate or reduce current switching noise interaction with digital circuit and the power circuit board can include motor drive circuits including power MOSFETs with gate drivers for each of three phases of the motor, a 5V power supply that powers all of the circuit boards inside the tool, and a 12V boost power supply for the gate drivers.

The power tool can include a processor board, a trigger board, a power board, a display board and an RF carrier board, all in the housing. The processor board can reside at a bottom portion of the handle between the power board and a releasable battery pack. The processor board can include a motor control digital signal processor, motor position analog circuits, phase current sensing circuits, torque signal circuits, and power supply. The display board can reside at a back end portion of the (upper cylindrical portion) of the housing and is in communication with an externally visible display having a keypad User Interface. The RF carrier board can be positioned adjacent the display board and for wireless fastening data transmission.

The cordless power can include an overcurrent protection circuit in the housing. The overcurrent circuit can include a pair of dual comparators that monitor the scaled current, both positive and negative. The overcurrent circuit compares the monitored scaled current to a predetermined trip value and is configured to cause a motor pulse width modulated (PWM) signal to skip a cycle thereby reducing current demand when the monitored scaled current is at or exceeds the predetermined tip value. The circuit allows the PWM signal to resume normal operation after the overcurrent condition alleviates thereby avoiding overcurrent conditions during an active fastening operation without terminating the fastening.

Other embodiments are directed to methods of operating a precision-fastening cordless power tool. The method includes: (a) providing a cordless, hand-held power tool having a rechargeable battery power supply; (b) measuring motor current using a Kelvin resistor held in the power tool; (c) determining torque output of the power tool based on torque data from an onboard transducer; (d) fastening a target work piece to a defined torque using the cordless power tool; and (e) dynamically controlling the motor using the measured motor current and transducer torque data during the fastening step to adjust motor current with a resolution of at least about 0.1 A for a current operating range of between at least 1-100 A to thereby precisely control stop and run motor output for precision fastening.

The current operational range can be between about −150 A to about 150 A.

The method can also include storing fastening values associated with at least 100 separate fastening operations, then wirelessly relaying the fastening values to a remote device.

The method can also include dissipating heat from power switches on a power board in a handle of the power tool using copper filled areas on the power circuit board.

The method can include monitoring for overcurrent situations using dual comparators that monitor scaled current, both positive and negative, and comparing the monitored scaled current to a predetermined trip value to cause a motor pulse width modulated (PWM) signal to skip a cycle to reduce current demand when the monitored scaled current is at or exceeds the predetermined tip value, then allowing the PWM signal to resume normal operation after the overcurrent condition alleviates to thereby avoid overcurrent conditions during an active fastening operation without terminating the fastening.

Still other embodiments are directed to computer program products for a cordless fastening power tool having a motor. The computer program product includes a non-transitory computer readable storage medium having computer readable program code embodied in the medium. The computer-readable program code includes: (a) computer readable program code configured to measure motor current using a Kelvin resistor held in the power tool; (b) computer readable program code configured to determine torque output of the power tool based on torque data from an onboard transducer; and (c) computer readable program code configured to dynamically control the motor using the measured motor current and transducer torque data during a fastening operation to adjust motor current with a resolution of at least about 0.1 A for a current operating range of between at least 1-100 A to thereby precisely control stop and run motor output for precision fastening.

The electric motor can be a brushless electric motor.

The precision wireless tool can selectively operate with (a) angle control with torque monitoring or (b) torque control with angle monitoring.

Embodiments of the invention can comprise at least one Hall based position sensor for angle positioning.

Embodiments of the invention can include optimal venting locations of the tool housing.

Embodiments of the invention operate with three different low torque modes, including 4 Nm, 8 Nm and 12 Nm.

In some embodiments, the drive spindle can include a thrust bearing and an output spindle decoupled from gearing and the transducer, and load and shock can be substantially (if not totally) absorbed through the housing, not the transducer.

In some embodiments, the tools can include a plurality of hall sensors held internal to the motor in communication with the motor control circuit to allow for at least one of angle monitoring or angle positioning.

Some embodiments are directed to hand-held cordless fastening power tools that include: a housing; a motor residing in the housing, the motor having a rotor that drives an output shaft; a torque transducer in the housing in communication with the output shaft; a dynamic motor control circuit residing in the housing in communication with the motor and torque transducer, the dynamic motor control circuit comprising a Kelvin resistor in communication with the motor for measuring motor current; and an onboard display held by the housing in communication with an onboard externally accessible User Interface with at least one input button residing proximate to the display, wherein the display presents defined icons associated with different selectable settings to allow a user to be able to select operational parameters including a soft or hard joint configuration and angle or torque monitoring.

The foregoing and other objects and aspects of the present invention are explained in detail in the specification set forth below.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIGS. 5A-5C are graphs of torque versus angle for different control settings for different fastening modes provided by a single tool including torque control with angle monitoring and angle control with torque monitoring according to embodiments of the present invention.

FIGS. 17A-17D are screen shots of display screens of a tool according to embodiments of the present invention.

DESCRIPTION OF EMBODIMENTS OF THE INVENTION

Figure 1A:
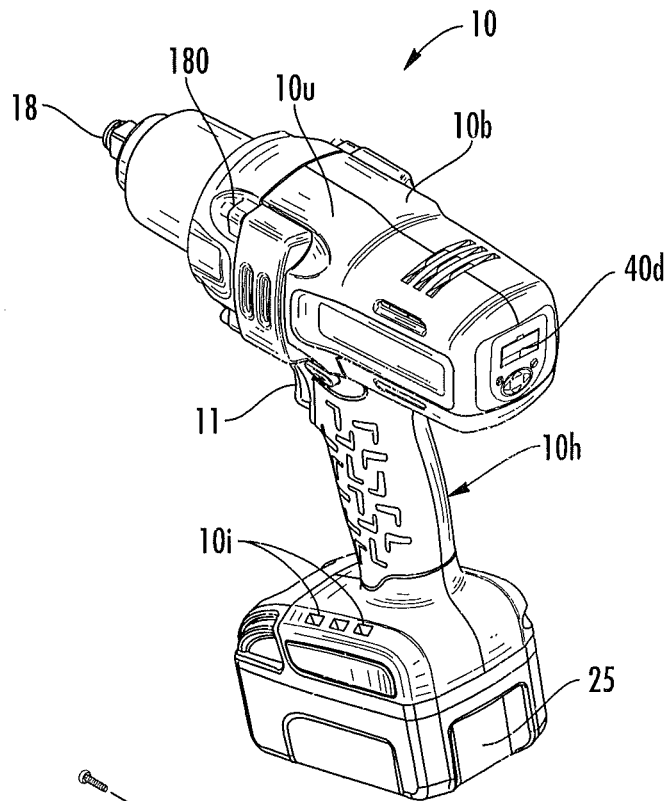
FIG. 1A is a side perspective view of an exemplary cordless power tool according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof.

It will be understood that when a feature, such as a layer, region or substrate, is referred to as being "on" another feature or element, it can be directly on the other feature or element or intervening features and/or elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected, attached or coupled to the other element or intervening elements may be present. In contrast, when a feature or element is referred to as being "directly connected", "directly attached" or "directly coupled" to another element, there are no intervening elements present. Although described or shown with respect to one embodiment, the features so described or shown can apply to other embodiments. The term "about" refers to +/−variations of less than 20%, typically +/−10%.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein.

The term "cordless" power tool refers to power tools that do not require plug-in, hard wired electrical connections to an external power source to operate. Rather, the cordless power tools have electric motors that are powered by on-board batteries, such as rechargeable batteries. A range of batteries may fit a range of cordless tools. Embodiments of the present invention are particularly suitable for fastening tools such as for example, screwdrivers, ratchets, and nutrunners. Embodiments of the invention may be particularly suitable for precision fastening power tools that can be used for applications where more exact control of the applied output is desired.

Figure 1B:
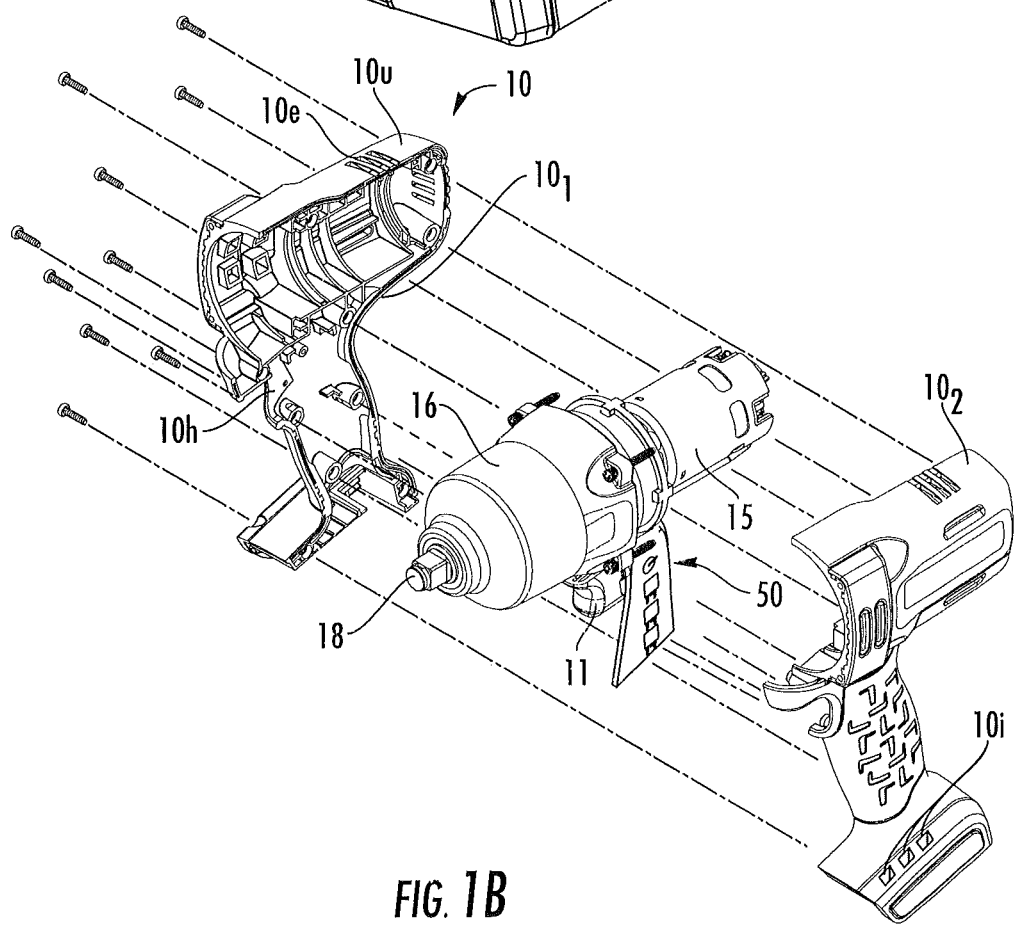
FIG. 1B is an exploded view of the device shown in FIG. 1A according to embodiments of the present invention.
Figure 16A:
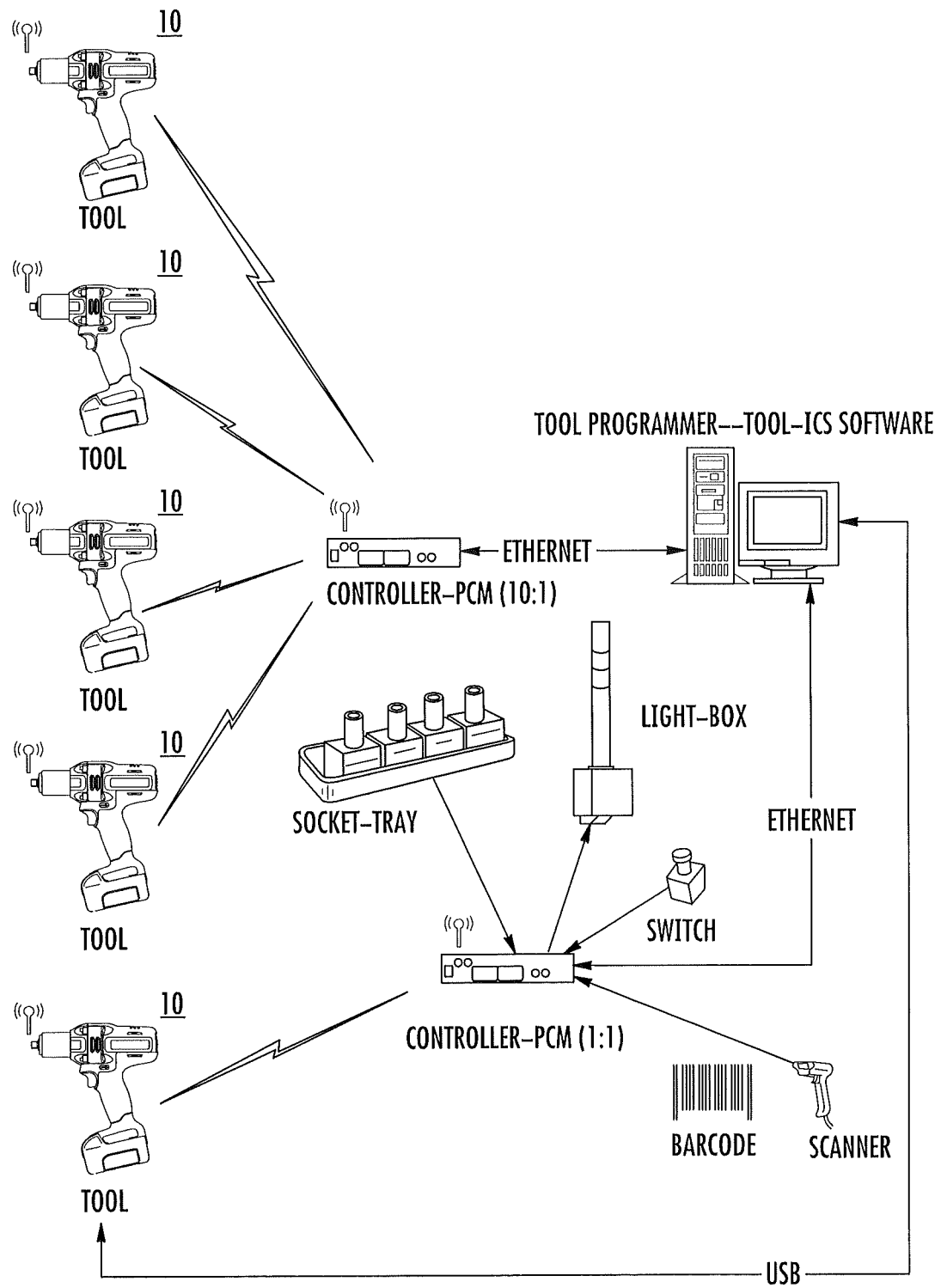
FIG. 16A is a schematic illustration of tools that wirelessly communicate with a controller PCM in a worksite/factory according to embodiments of the present invention.
Figure 16B:
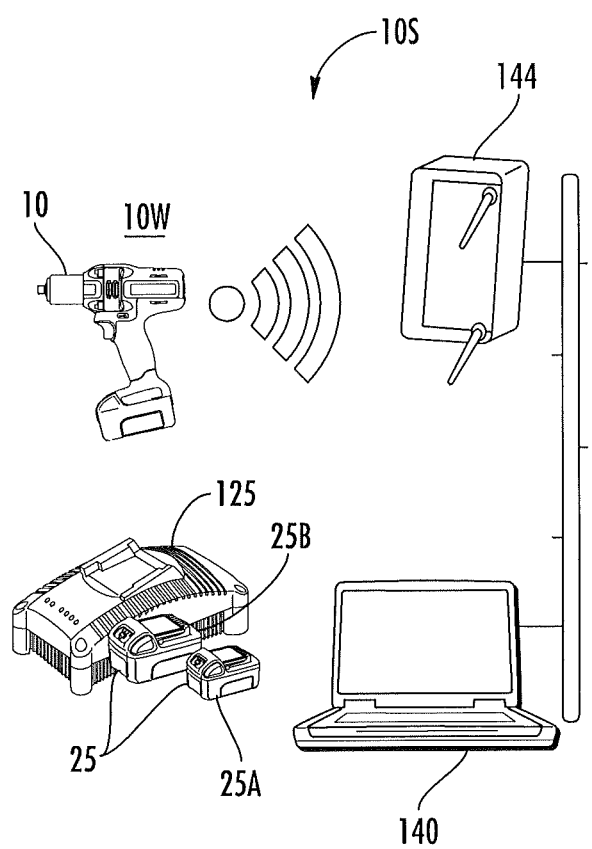
FIGS. 16B-16D are schematic illustration of precision cordless power tool wireless systems according to embodiments of the present invention.

FIGS. 1A and 1B illustrate an example of a cordless power tool 10 that includes a housing body 10b, a motor 15, a gearcase 16 and a tool output shaft 18. As shown, the housing 10b encases the motor 15 and partially surrounds the gearcase 16. However, other housing and gearcase configurations may be used. The gearcase 16 encloses a drive train as is well known (not shown). The housing body 10b can comprise an impact resistant molded material such as glass-filled nylon. The drive train can include a durable metallic planetary gear configuration. The lower portion of the housing can engage and release a rechargeable battery pack 25 (FIG. 1A). The battery pack 25 holds cells defining a low-voltage (rechargeable) battery such as about 36V or less, including 24V or less, such as 20V, 18V, 12V and the like. In some embodiments, the battery pack 25 is a 20V lithium ion battery cells. As shown in FIGS. 4B and 16B, the battery pack 25 can be provided as interchangeable different sizes 25A, 25B, respectively. The different battery packs can be 5 and 10 cell battery packs. A charger 125 (FIG. 16B) can be configured to charge both sizes.

The housing body 10b can include an external control such as a trigger 11 and a UI (user interface) with a keypad and a display 40.

The housing body 10b may optionally be provided as two matable shell components $10_1$, $10_2$ as shown in FIG. 1B. The power tool 10 can be configured as a "pistol" type power tool with a substantially cylindrical or barrel shaped upper portion 10u that merges into a downwardly extending handle portion 10h.

Figure 2:
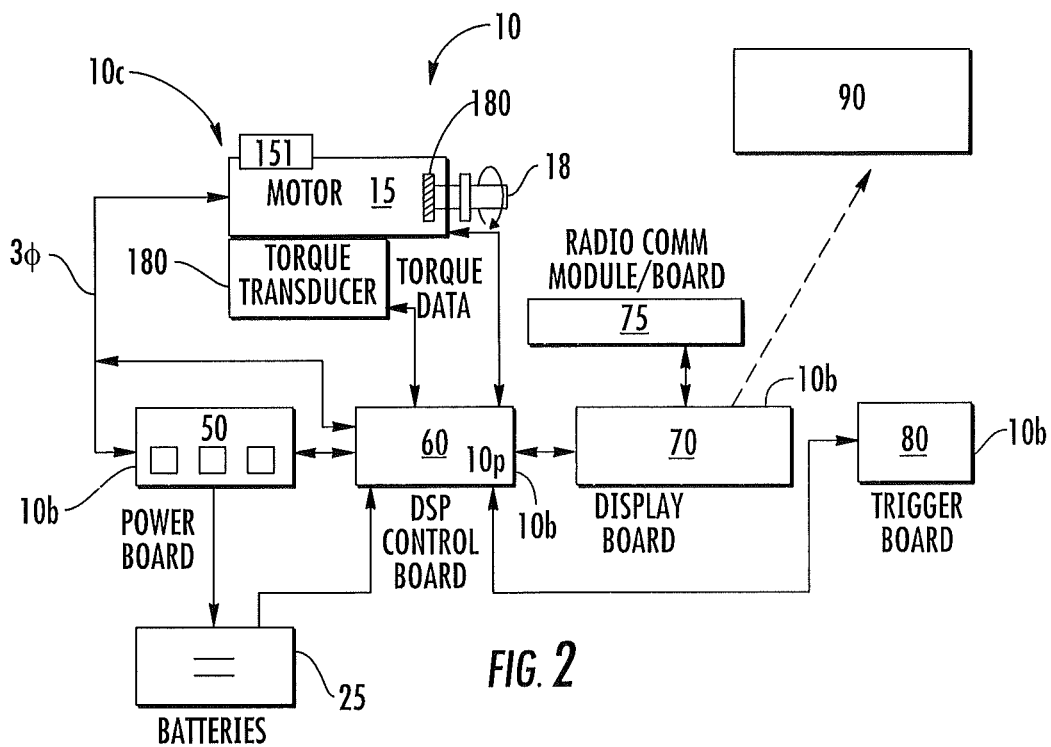
FIG. 2 is a block diagram of a circuit for a cordless power tool according to embodiments of the present invention.

FIG. 2 illustrates a block diagram of a closed loop power tool circuit 10c. The power tool circuit 10c can also directly measure torque from a torque transducer 180 in communication with the external output shaft 18. The torque transducer 180 can be held inside the tool body between the motor output shaft (upstream of the output shaft 18) and the drive train, e.g., proximate the ring gear, such as described in PCT/US2011/030653, the content of which is hereby incorporated by reference as if recited in full herein.

The power tool circuit 10c can include a plurality of circuit boards 10b. The circuit boards shown include a power circuit board 40, a digital processor circuit board 60 (which can include at least one processor 10p), a display board 70, a radio communication board 75, and a trigger board 80. The radio communication board 75 allows the tool to optionally or selectively wirelessly communicate with an external (remote) device 90. One or more of the discrete circuit boards can be provided as sub-divisions on additional discrete boards and/or two or more of the circuit boards can be combined or broken into other circuit board configurations. The circuit boards are typically printed circuit boards. The term "circuit boards" refers to both flexible circuit board substrates and substantially rigid circuit board substrates as well as combinations of the same.

As shown in FIG. 2, the circuit 10c can include a plurality of hall sensors 151 connected to the motor 15 (typically held internal to the motor 15). The hall sensors 151 can connect to the digital circuit board 60 located away from the motor 15 in the tool 10. The motor hall sensors 151 can allow for the tool to have angle monitoring and/or positioning control and this control can be a selectable tool operational mode. The hall sensors 151 can include at least three hall sensors 151 that can reside internal to the motor 15 (e.g., internal to a housing of the motor) (see, e.g., FIG. 13B).

The tool can have a wireless option that can allow for process control with input/output commands via a UI on the tool and/or remote computer 140 (FIG. 16B) in communication with and/or associated with the onboard display 40 which can allow a worker or remote user to programmatically select one of a plurality of different tool operations and/or adjust certain defined parameters (see, e.g., FIGS. 17A-17D, for example).

The tool 10 can be configured for "live" archiving to a database, selectable tool configuration switching, communication of a plurality of tools 10 to a common wireless receiver/gateway 144 (FIG. 16B-16D), typically allowing for concurrent wireless communication per receiver 144 of between about 5-20 tools, more typically about 10. The tool 10 alone or via an external device 90 can generate preventative maintenance alarms to notify a user, supervisor or other personnel (local or remote) that preventative maintenance may be appropriate or that the tool needs servicing or inspection or calibration. The alarms may be provided as auditory or visual alarms, such as messages or icons on the onboard display 40 and/or a color indicator LED light (e.g., yellow or red, blinking or continuous).

Figure 16C:
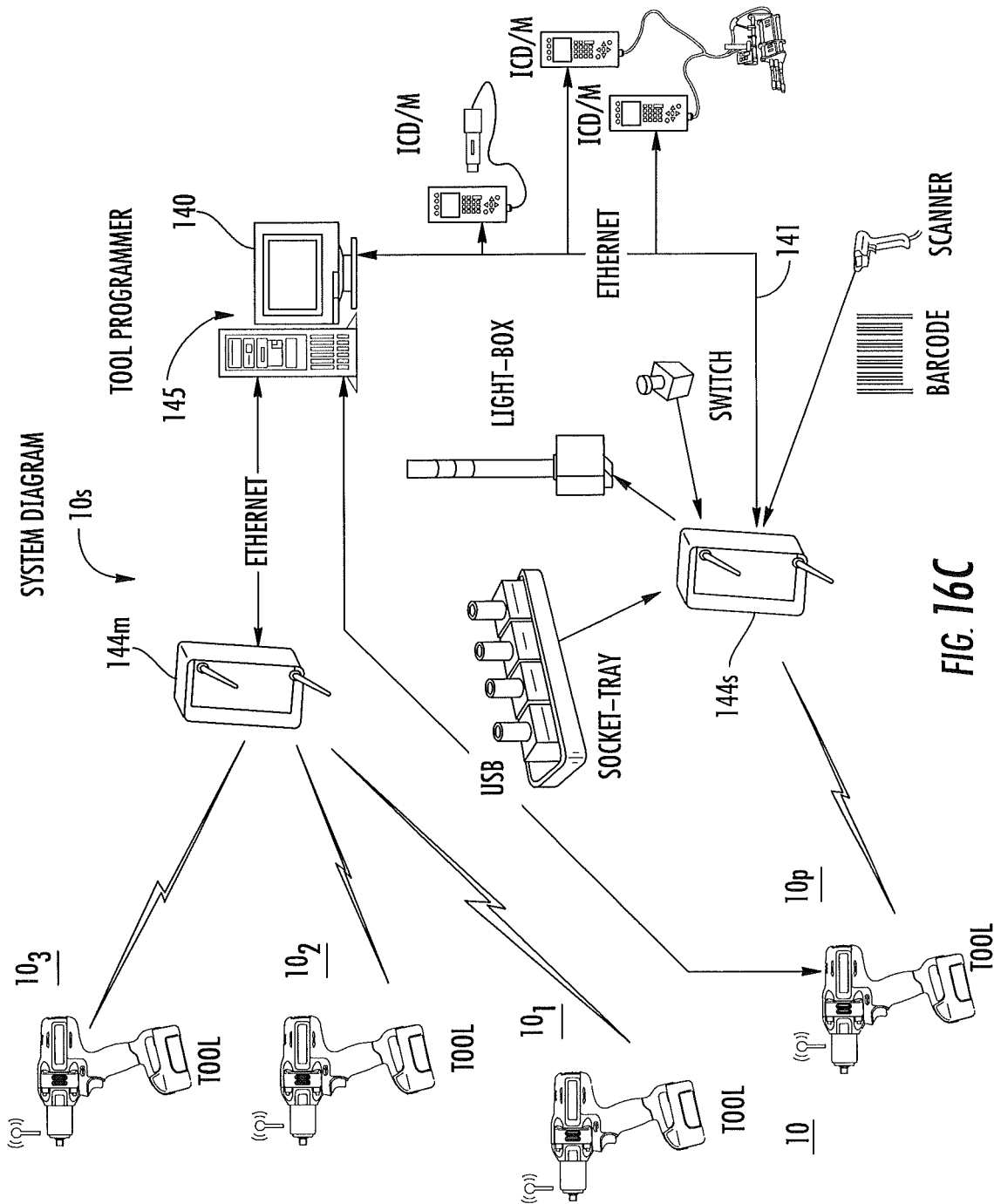
Figure 16D:
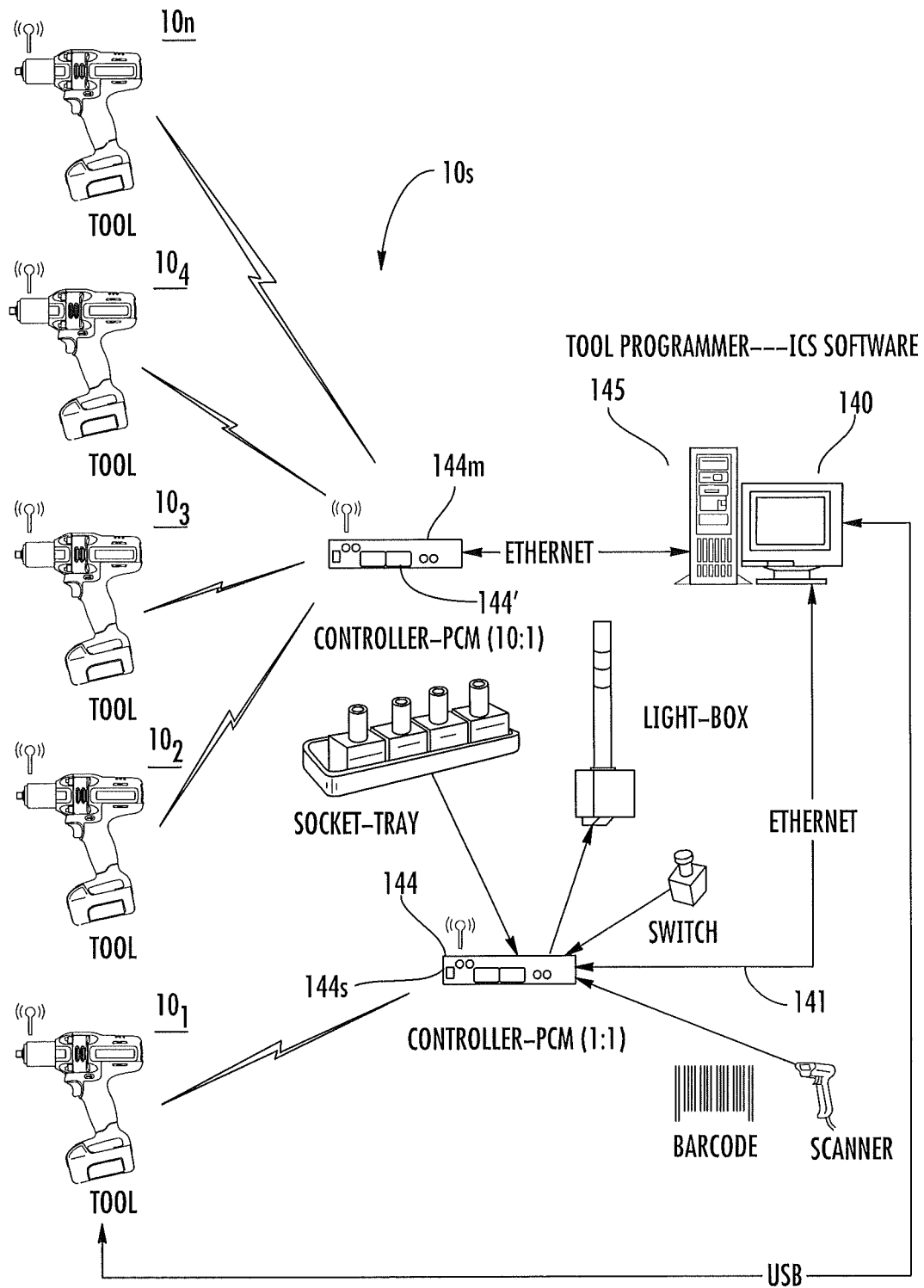
Figure 17C:
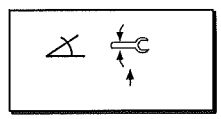
Figure 17C:
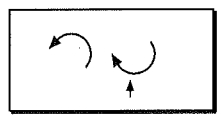
Figure 17C:
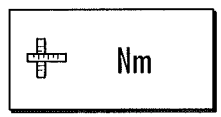
Figure 17C:
Figure 17C:
Figure 17C:
Figure 17C:
Figure 17C:
Figure 17C:
Figure 17D:
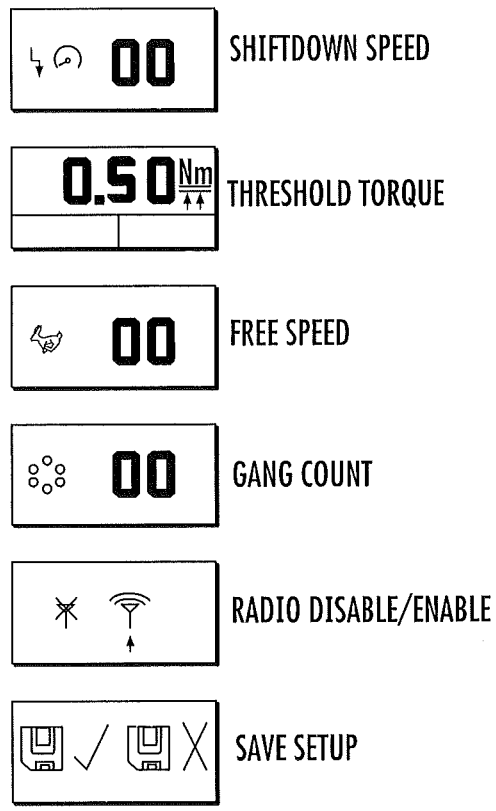

FIGS. 16C and 16D illustrate a tool monitoring/control system 10s with a tool programmer station 145. The tool programmer station 145 can be configured to connect a cord that plugs into the tool via an input port 10p, such as a USB port as shown in FIG. 16C (and FIG. 4D).

FIGS. 16C and 16D illustrate that the tool programming station 145 includes a controller (e.g., at least one processor), shown as a computer 140 that can communicate with a receiver 144 (e.g., a stand-alone receiver or a receiver integrated in a controller/process control module) and a switch 141. The tool 10 can operate on a single 1:1 (tool to wireless receiver) ratio in a single process control module operational control mode 144s or a multiple tool to receiver ratio, e.g. via a tool process control module or receiver 144m, typically a 10:1 tool to wireless receiver ratio.

The system 10s can be configured with an Ethernet (local area network or "LAN") capability, multiple I/Os (typically between 5-10, such as about 8), field bus cards, serial ports for a bar code scanner and printer and ICS (internet connection sharing compatible) software. The computer 140 can be any suitable computer form, including stationary or portable forms such as desktops, laptops, electronic notebooks, electronic tablets, smartphones and the like.

Figure 3:
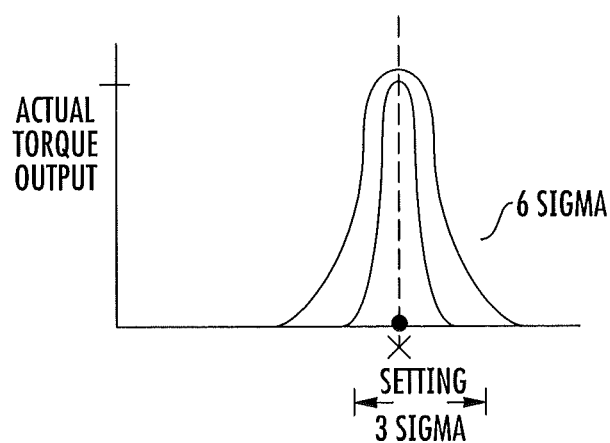
FIG. 3 is a graph of precision torque output according to embodiments of the present invention.

FIG. 3 illustrates that, in some embodiments, the wireless power tool 10 can consistently achieve a high level of repeatability in hitting the output target torque. This is defined as the capability of the tool. Capability is defined by industry standards (ISO5393) and provides a common metric for describing the ability of the tool to achieve its target to a high degree of repeatability and little deviation from that target over the life of the tool. The is defined as six sigma divided by the mean (average) of the sample population. To determine an overall capability for the tool, a number of samples, e.g., about 50 or 100 samples, are taken at a range of torque values and extreme range of joint stiffnesses and repeated after extended life test to ensure consistency over time. As a consequence of the methods of control implemented, the fastening power tool is able to achieve a low capability, such as about 6.25% or less, typically about 5%, about 4%, about 3%, about 2% or less at the rated torque output (and RPM limit), e.g., 4 Nm, 8 Nm and 12 Nm. A tool with a capability less than 5% is considered an 'A' class tool as the standard deviation (sigma) decreases, the repeatability gets better as evidenced by the decreasing capability number. This degree of accuracy is indicative of the superior control achieved by the tool. The term "precise," and derivatives thereof, as used herein, means that the torque output (mean) by the fastening power tool has a low standard deviation, such as within +/−3 sigma and typically within about +/−6 sigma of the defined target (preset) output torque value. The sigma rating represents the mean value of the actual torque output to its target. It shows how much variation there is from the mean (or average) expected value. A low standard deviation indicates that the data points tend to be very close to the mean, whereas high standard deviation indicates that the data points are spread out over a large range of values. A six sigma rating refers to a fastening process in which about 99.99966% of the torque output is statistically expected to be within the standard deviation tolerance band (about 3.4 defects per million).

In some embodiments, the electric motor 15 can be a brushless electric motor.

Embodiments of the invention operate with three different low torque modes, including about 4 Nm, 8 Nm and 12 Nm with about 1500, 1150 and 750 rotations per minute (RPM), respectively. The tool can have adjustable speed of between about 10% to about 100%.

Figure 4A:
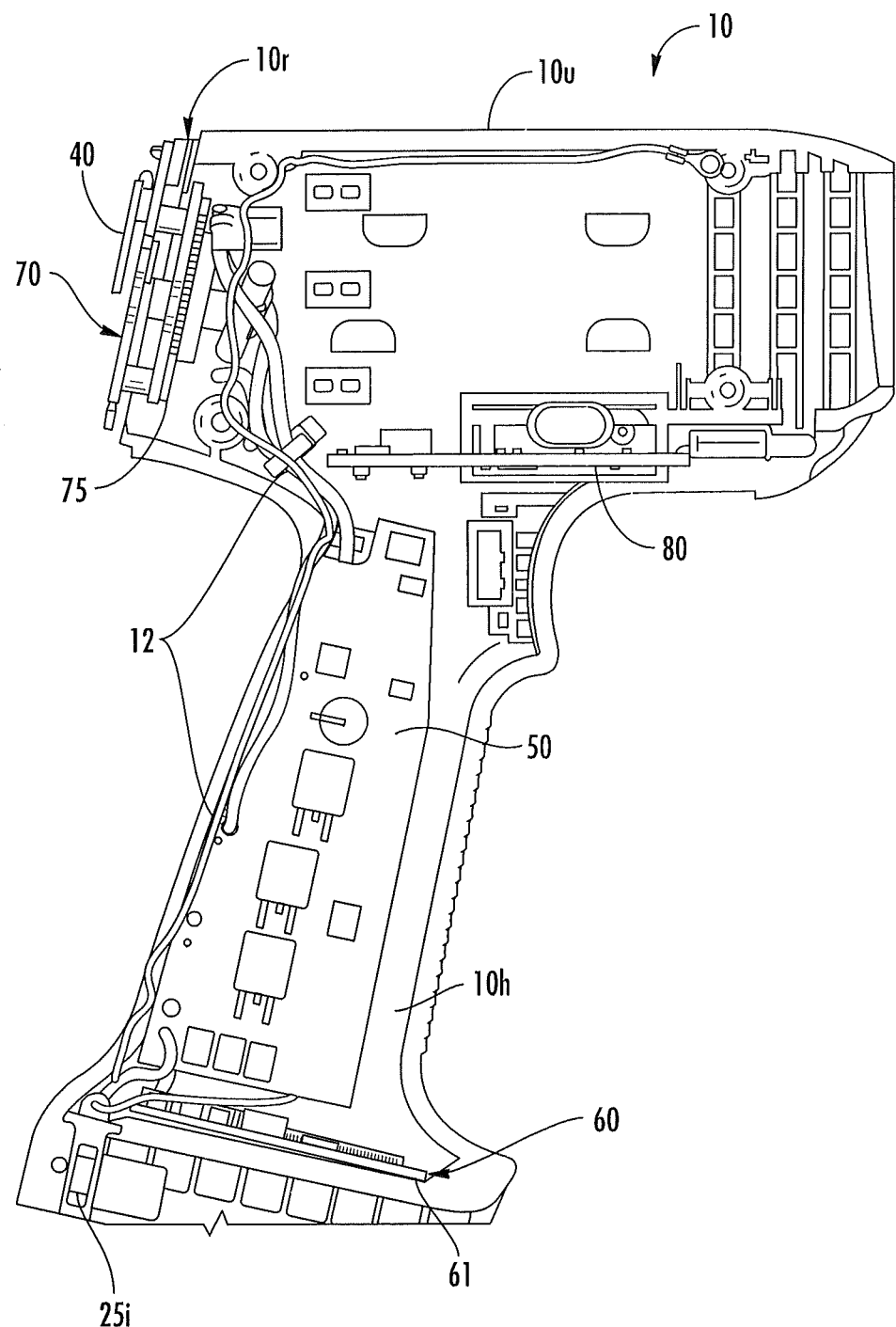
FIG. 4A is a side view of one half of the tool housing shown in FIG. 1A illustrating certain internal circuit board components according to embodiments of the present invention.
Figure 4B:
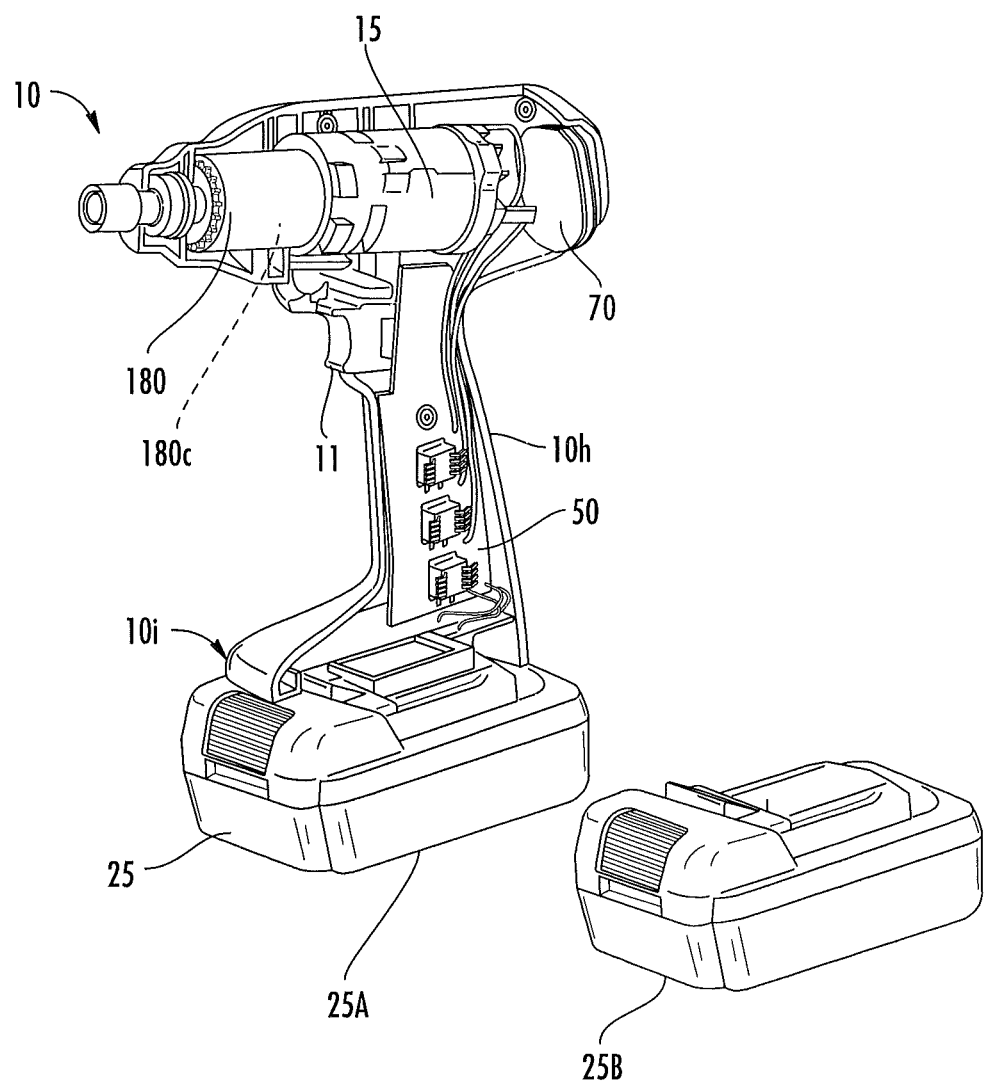
FIG. 4B is a partial cutaway front side perspective view of the tool shown in FIG. 1A according to embodiments of the present invention.

As shown in FIGS. 4A and 4B, the radio board 75 can be closely spaced to the display board 70 in a rear end portion of the housing 10r. Alternatively, the radio board 75 and display board 70 can be combined as an integrated or single board (not shown). Still referring to FIG. 4A, the trigger board 80 can reside under the motor 15 (FIG. 4B) in the upper portion of the handle 10h or lower portion of the barrel 10u. The power board 50 can reside in the handle 10h. As shown, the processor board 60 resides at a lower portion of the handle 10h below board and the processor board 60. Wires 12 can be routed up through the housing handle 10h snugly spaced over one long edge of the power board 50 and between one end of the trigger board 80 and (closely spaced to) an inner wall of the housing as the housing transitions from the handle to the barrel 10u from the battery interface 25i to the upper housing 10u to power certain electrical components and/or to provide signal circuit connections.

Air for cooling can enter the tool 10 near the bottom of the handle 10h via air inlets 10i and can flow over the power board 50 to the top of the tool 10u before exhausting out of the housing via exhaust ports 10e. Embodiments of the invention can include optimal venting locations of the tool housing such as intake vents 10i as a plurality of elongate apertures, such as substantially horizontally oriented elongate apertures, residing proximate the lower end portion of the pistol handle above the battery pack (FIGS. 1B, 4B, for example).

The battery terminals can be located near the bottom of the handle 10h allowing a short convenient connection between the battery 25 and the power board 50.

Component protection can be provided by a Transient Voltage Suppressor (TVS) device that can be located on the power board 50 where the battery terminal connection 25i is made. This added TVS device can protect sensitive components from electrical overstress due to inductive load switching from the motor drive circuits.

The tool 10 can have a transducer 180 and a transducer control 180c as shown in FIG. 4B. The transducer control 180c can provide closed loop control, single digit combined capability, multiple configurations for a single tool, torque traceability to NIST, prevailing torque algorithm, data archiving, speed control, soft start, shift down, Gang count, Cycle count, and can be ICS compatible.

Figure 4C:
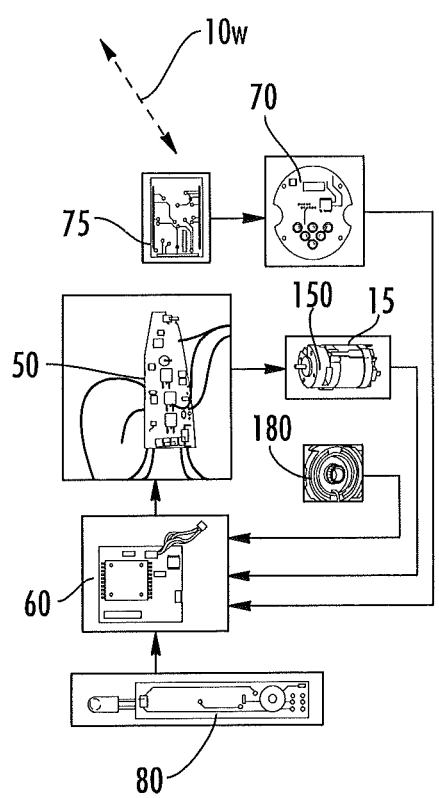
FIG. 4C is a schematic illustration of circuit boards and circuit control inputs and outputs according to embodiments of the present invention.

FIG. 4C illustrates the boards 50, 60, 70, 75 and 80 with exemplary circuit inputs and outputs (shown by arrows and solid lines) from the boards to other boards and/or other components such as the motor 15 and the torque transducer 180 according to embodiments of the present invention. For example, the radio board 75 sends and receives radio signals for wireless communication 10w. The display board 70 controls the display 40 and input from the adjacent onboard keypad. The power board 50 sends power to the motor 15. The DSP (processor) board 60 tells the power board how to send power to the motor 15. The trigger board 80 senses trigger 11 and reverse button movement and can support headlight and buzzer components.

Figure 4D:
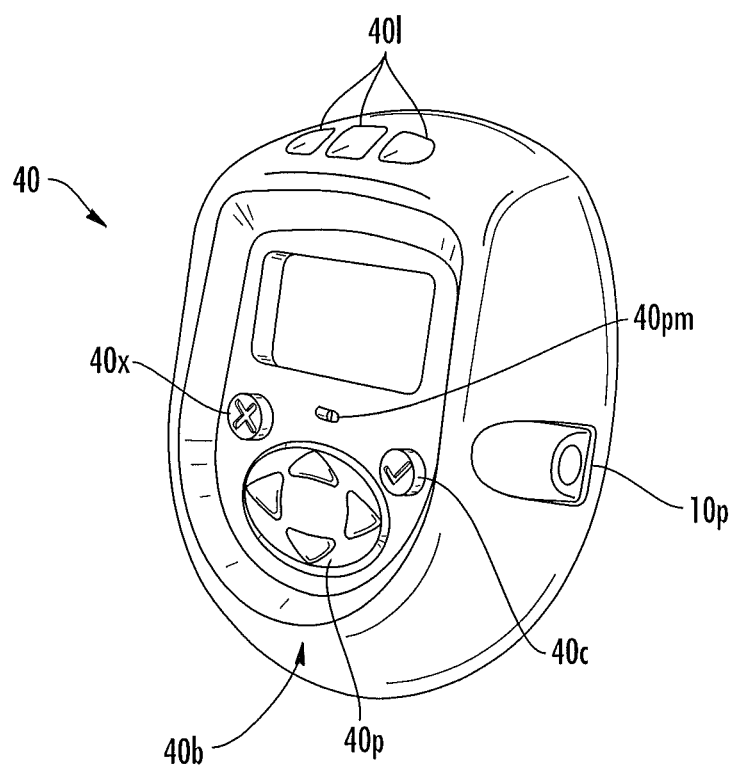
FIG. 4D is a back view of the display/UI portion of the tool shown in FIG. 1A according to embodiments of the present invention.

FIG. 4D illustrates an example of an onboard tool display 40 that includes programmable input buttons 40b which can include an elastomeric pad 40p with arrow selections, an "x" button 40x (for deselecting an item or turning an action off) and a check button 40c (for allowing an affirmative selection or action). The tool 10 can include a USB or other communications interface port 10p that can reside anywhere on the tool to communicate with at least one onboard processor 10p (typically on the control board 60, FIG. 2) and the display 40. The tool 10 can be configured to display defined output modes and adjustments that can be selected, deselected or adjusted based on the UI buttons 40b. The term "button" refers" broadly to various UI inputs including touchscreen and tactile buttons.

Figure 5A:
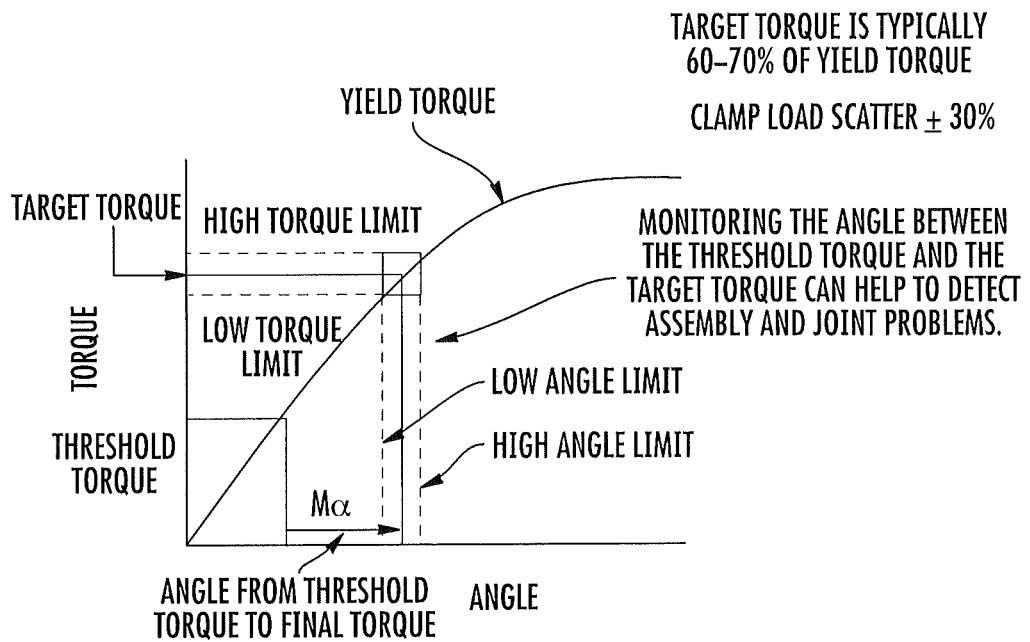
Figure 5B:
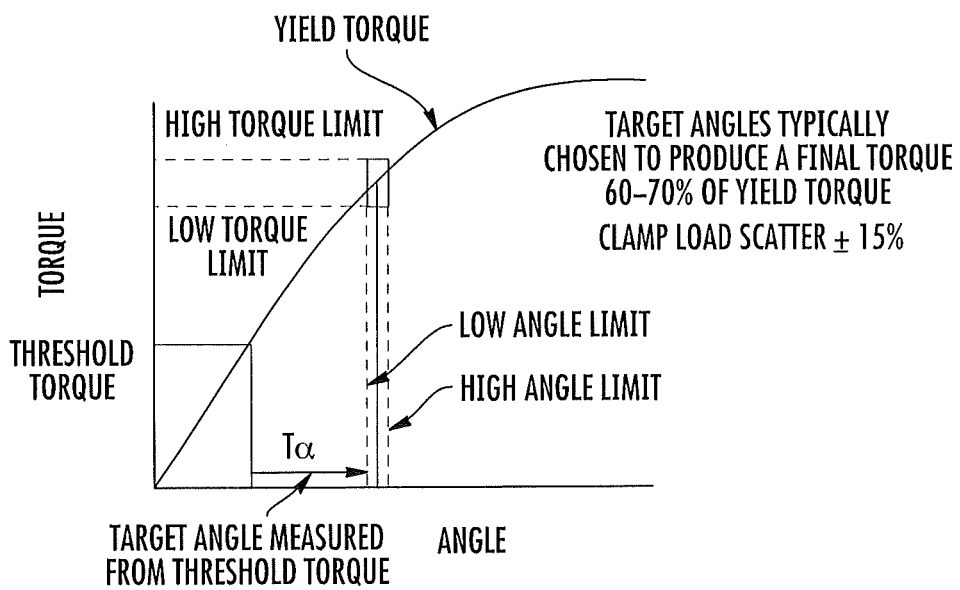

FIGS. 5A-5C are graphs of exemplary fastening strategies allowed by the tool 10 according to embodiments of the present invention. The tool 10 can be configured to operate with torque control with angle monitoring or angle control with torque monitoring using Hall Effect sensor 151 and onboard torque transducer 180 with a closed control loop. The tool 10 can operate with have defined high and low torque limits and defined high and low angle limits in both torque control and angle control modes. FIG. 5A illustrates a target torque in a box at the upper right side of the graph. Monitoring the angle between the threshold torque and the target torque (Mα) can help to detect or identify assembly and joint problems. Most users don't know what angle limits to use and rarely use such a feature. The target torque is typically between about 60-70% of yield torque (claim load scatter at +/−30%).

FIG. 5B shows that a target angle (Tα) can be measured from threshold torque. The target angle is typically chosen to produce a final torque that is between about 60-70% of yield torque (clamp load scatter at +/−15%).

FIG. 5C illustrates a multiple zone protocol with a first max cut-in torque and angle ramp up at "A", to a high and low prevailing torque limit in a prevailing zone at "B", then to a tightening zone with torque increasing to a final tightening target at the end of zone "C".

The tool 10 can be configured as a compact, relatively light-weight tool. The compact nature of the housing body 10b defines a small interior envelop and/or positions circuit components close together and can potentially cause signal disruption and/or reliability or operational dysfunction. To overcome these obstacles, embodiments of the invention separate digital signal components from certain analog components (switches and the like) by placing the processor board below the motor 15 and below the power board 50. In some embodiments, the compact tool 10 can weigh between about 1.5-6 pounds, such as between about 1.5 to 2.5 lbs, typically about 2.00 lbs (exclusive of the battery pack) to about 5 pounds or less with the battery pack, including about 4 pounds or less, typically about 3.5 lbs, about 3 lbs or even less with a battery pack 25.

In some embodiments, the power board 50 has a length that occupies more than a major portion of a length of the handle 10$h$, and more typically substantially the entire length of the handle 10$h$. The power board 50 can be substantially planar and can reside closely spaced to one inner surface of one housing member $10_1$ or $10_2$ of the handle 10$h$. In other embodiments, the board 50 can reside medially between the two inner facing surfaces of the handle 10$h$. In some embodiments, the power board 50 can taper from a larger lower end 50$l$ to a smaller top or upper end 50$u$.

Figure 6A:
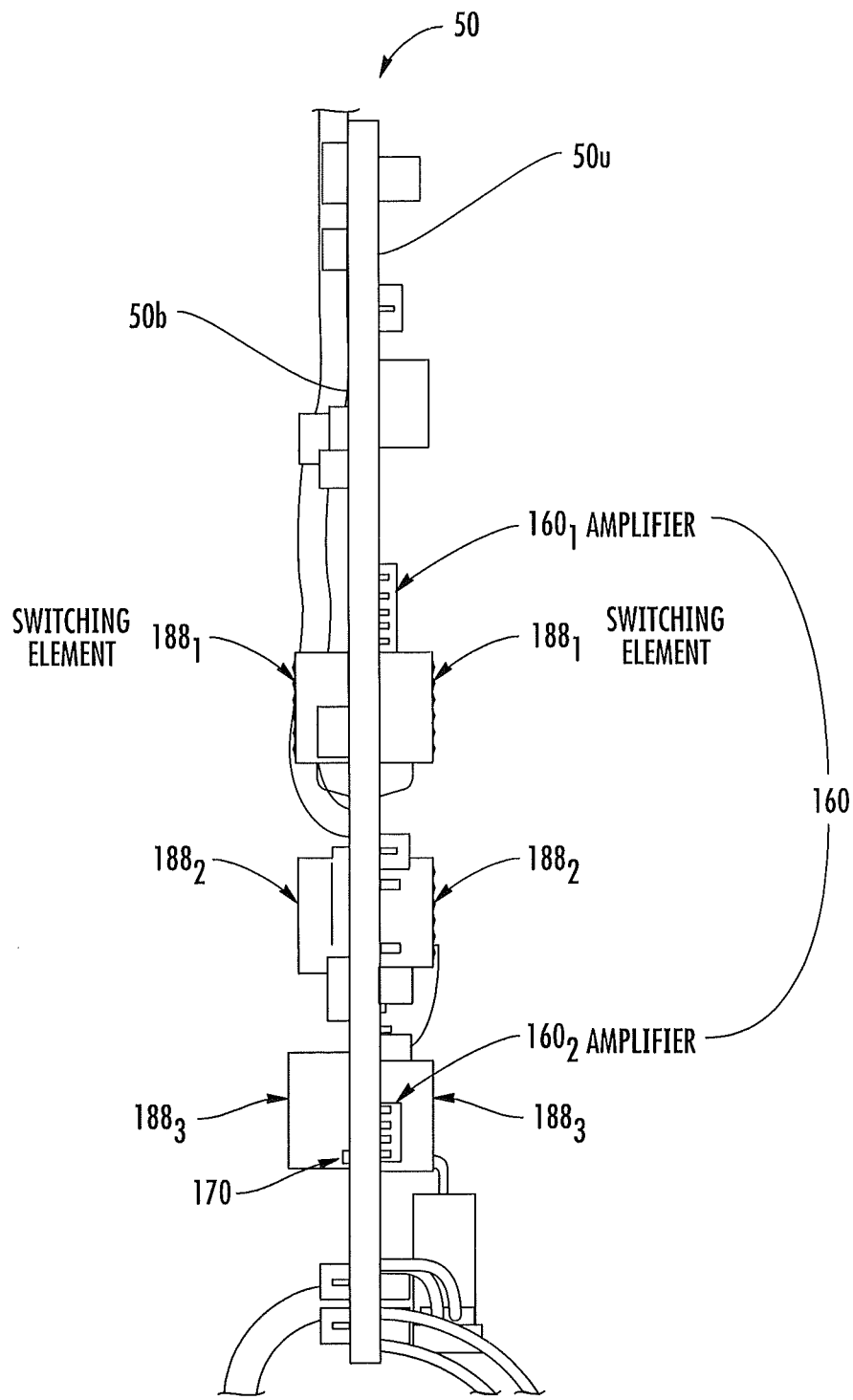
FIG. 6A is an enlarged side view of a power circuit board according to embodiments of the present invention.
Figure 6B:
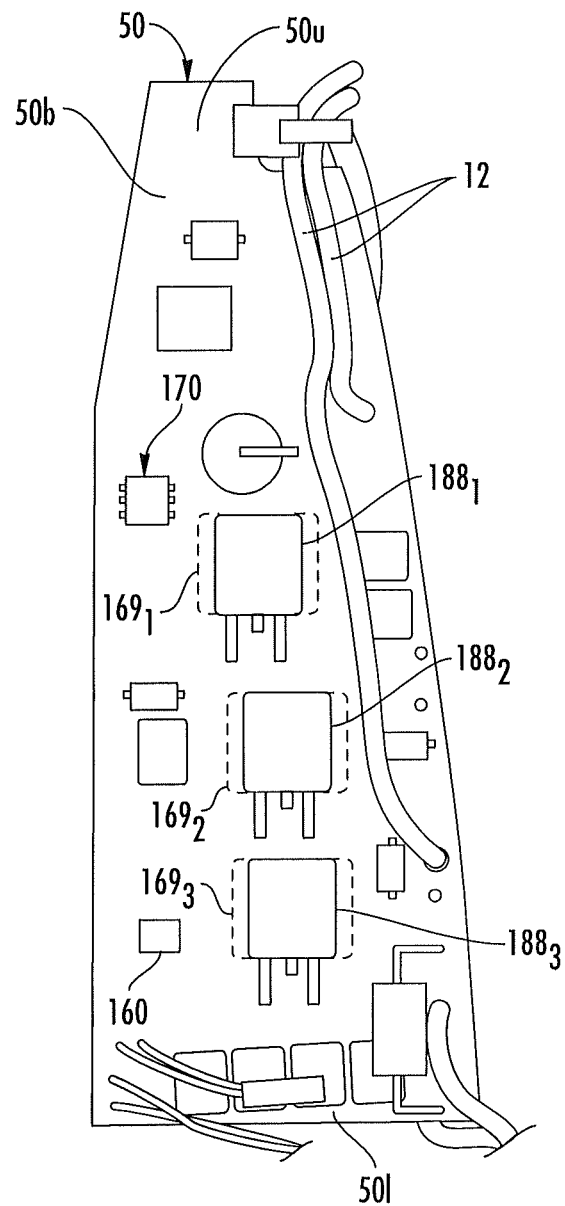
FIG. 6B is a top view of the power circuit board shown in FIG. 6A illustrating integral heat sinks according to embodiments of the present invention.
Figure 6C:
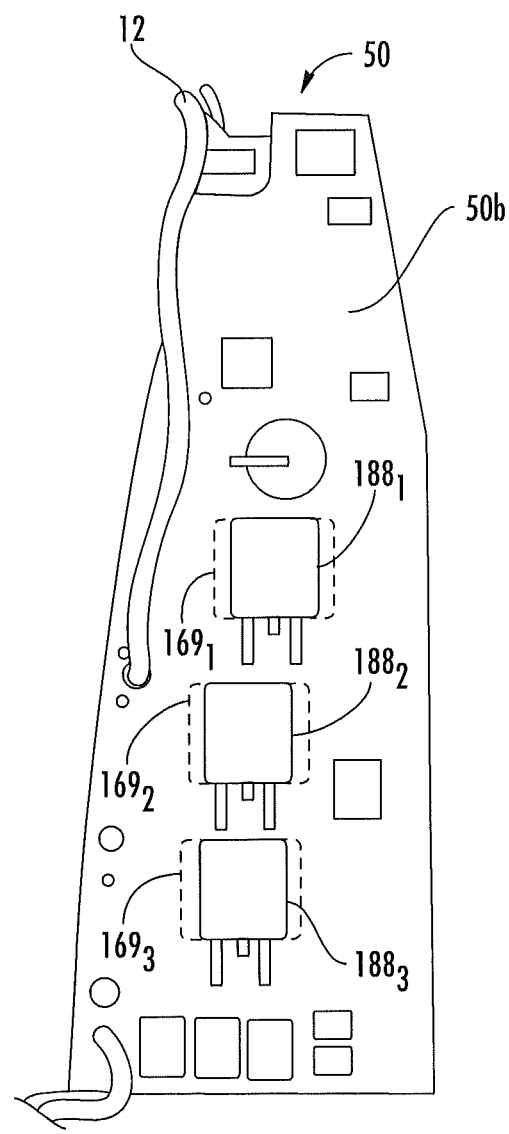
FIG. 6C is a rear view of the power circuit board shown in FIG. 6B according to embodiments of the present invention.

Heat management can be important to reliable operation and/or life of components associated with the on-board circuits, particularly those mounted to circuit boards. The typical method of removing heat from semiconductor devices is to attach a heat sink to them. FIGS. 6A and 6B illustrate that in some embodiments, the power board 50 does not require any discrete separate heat sinks as the circuit board 50 is configured itself to provide spatially discrete heat (integral) sinks. This configuration dedicates a fill area of thermally conductive material, such as copper, as heat sink regions $169_1$, $169_2$, $169_3$ on the top and bottom sides 50$t$, 50$b$, respectively of the board 50 for heat removal. Also, the switching devices 188, e.g., push-pull switches comprising semi-conductor components such as MOSFETs with gate drivers, can be mounted with respective switching elements $188_1$, $188_2$, $188_3$, residing directly across from each other on opposing sides (primary surfaces) of the board 50. Track losses can be reduced or are minimized as are opportunities for radiated emissions, resulting in less generated heat. This arrangement can eliminate the need for traditional heat sinks.

Embodiments of the invention employ resistive sensing for current measurement for motor control but does so in a very different way from conventional (non-precision type tools). The standard way to measure current is to use a low value resistor in the current path and measure the voltage drop across that resistor using a differential amplifier. This is not appropriate for a precision cordless tool with a high current, wide and dynamic operating range. The precision cordless tool 10 has a very wide dynamic range requirement, typically spanning at least 1-100 A, and in some embodiments between about minus (−) 150 A to positive (+) 150 A, with resolution to about 0.2 A or lower, such as at least about 0.1 A or between about 0.2-0.1 A.

Figure 7:
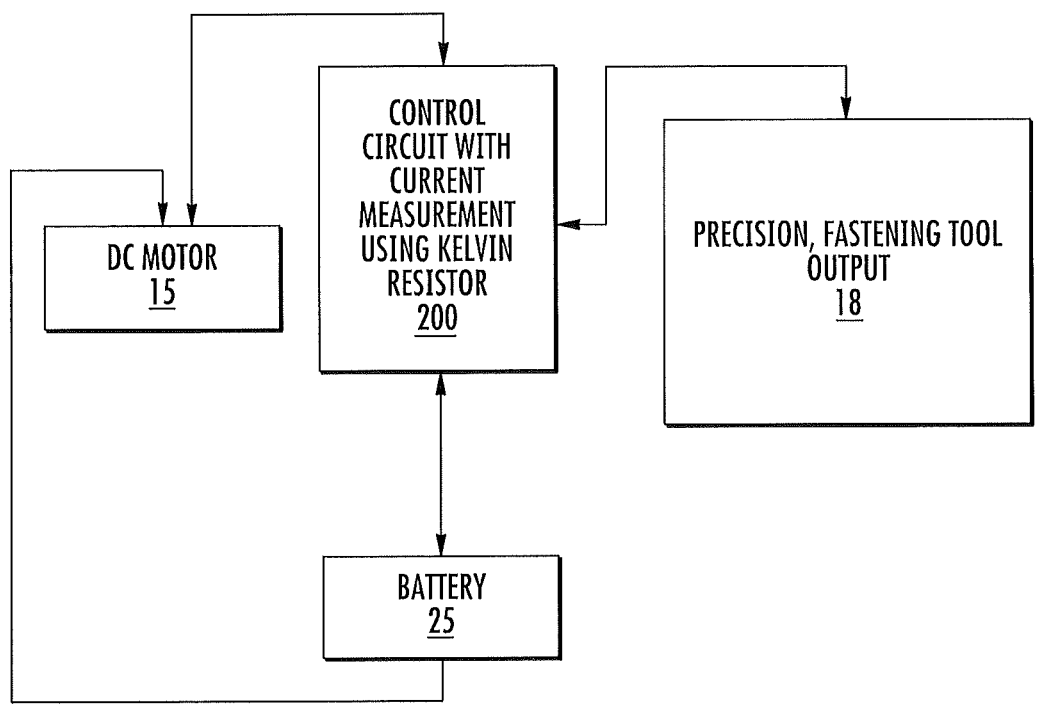
FIG. 7 is a block diagram of a power tool according to embodiments of the present invention.
Figure 8:
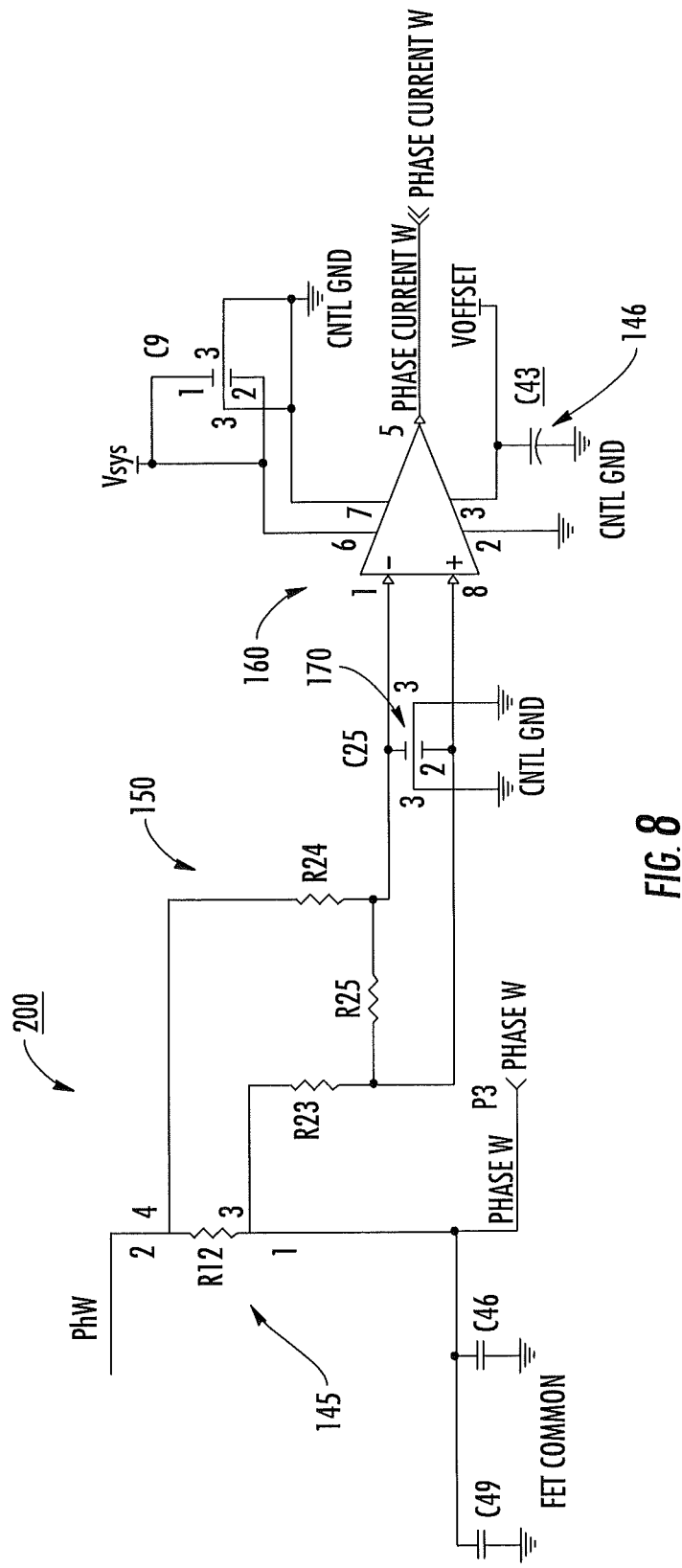
FIG. 8 is a diagram of a current measurement circuit according to embodiments of the present invention.

FIG. 7 is a block diagram of the power tool 10 illustrating that the power tool 10 with the current measurement circuit 200 in communication with the DC motor 15 used for controlling the fastening tool output (e.g., torque) of the output shaft 18. FIG. 8 is a circuit diagram of the current measurement circuit 200 illustrating a Kelvin resistor 150 in communication with the motor (shown as PhW in this example of the circuit) with two terminals for current measurement and two in the current path.

As shown in FIG. 8, in some embodiments, the current measurement circuit 200 can employ a very small value resistor 145 (e.g., micro-Ohm to milli-Ohm range or lower, typically under about 0.005 Ohms), shown as 0.001 Ohms, which can lead to further operational challenges. For example, a solder joint connecting the resistor to the circuit board can introduce a significant amount of resistance in proportion to the actual measurement resistance.

As is also shown in FIG. 8, to overcome this technical hurdle, a four terminal Kelvin resistor 150 (FIG. 8) can be used. This type of device provides two terminals for carrying the current to the motor 15 and two terminals dedicated to measurement. This arrangement substantially reduces, if not totally removes, the error-resistance introduced by the solder joints. Resistors R23 and R24 can have the same or substantially the same value, typically under 100 Ohms, and more typically about 49.9 Ohms. R25 can have a value greater than R23 and R24, typically double that of R23 and R24, such as about 100 Ohms, in some embodiments.

Another problem can be conducted and radiated noise susceptibility from using such small signals in the presence of fast changing high currents. A high gain differential current amplifier 160 (FIG. 8) with input filters 170 on each leg can be used. This high gain amplifier 160 can output phase current W. The term "high gain" means that the noted component can amplify the signal by at least 10×. In some embodiments, the high gain current amplifier(s) can provide a gain of about 20.

Also, the current measurement circuit 200 can include a small value capacitor 146 (shown as C43) that can be closely positioned to pins 2 and 3 of amplifier 160 and connected to $V_{OFFSET}$ of pin 3 and control ground. This capacitor 146 can be under 10 µF, typically between about 0.1 µF to about 1 µF.

For compact cordless power-tools 10, with a small interior envelope, there can be limited opportunity for cooling air flow, thus circuit protection can help provide safety and operational protection. Several parameters can be considered for board placement and/or design. For example, there can be electrical transients due to normal motor operation, motor back emf (bemf), over voltage/overcurrent due to motor stall or circuit failures and overall thermal management. During normal motor operation, a bemf is developed across each driven coil. The coil node is at the junction of high side source and low side drain. As the low side is turned off, the coil node is instantaneously driven low by the value of bemf raising Vgs of the high side by an equivalent amount. Gate to source voltage rating, Vgs, of the switching device may be exceeded, which can destroy the device. Typically a zener diode will be placed across the gate to source with the cathode at the gate as a means of protecting the device. In most cases, a diode that clamps this gate voltage to within one or two volts of the maximum rated voltage is adequate. However, in the case of a very compact powerful cordless tool, this modest protection can be insufficient. This is because the diode turn on time can be too slow to provide reliable protection. At least a 5V difference between zener rating and Vgs rating can be used to address this issue, using, for example, a 15V zener. The more conservative zener selection begins to turn on at a lower voltage than the 18V diode and therefore achieves a more robust level of protection by never allowing the Vgs to approach the maximum rated level.

Figure 9:
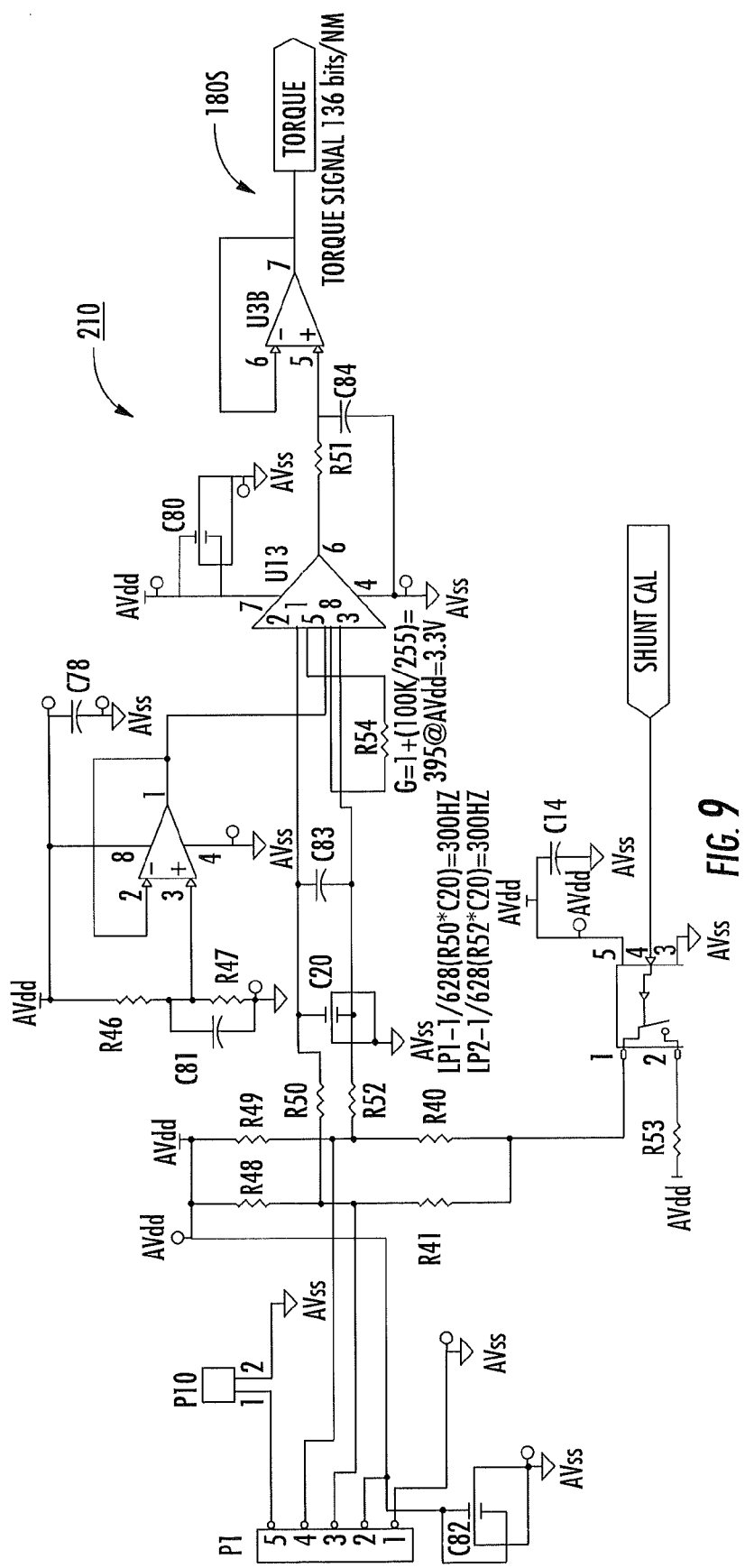
FIG. 9 is a diagram of an example of a torque measurement circuit according to embodiments of the present invention.
Figure 13A:
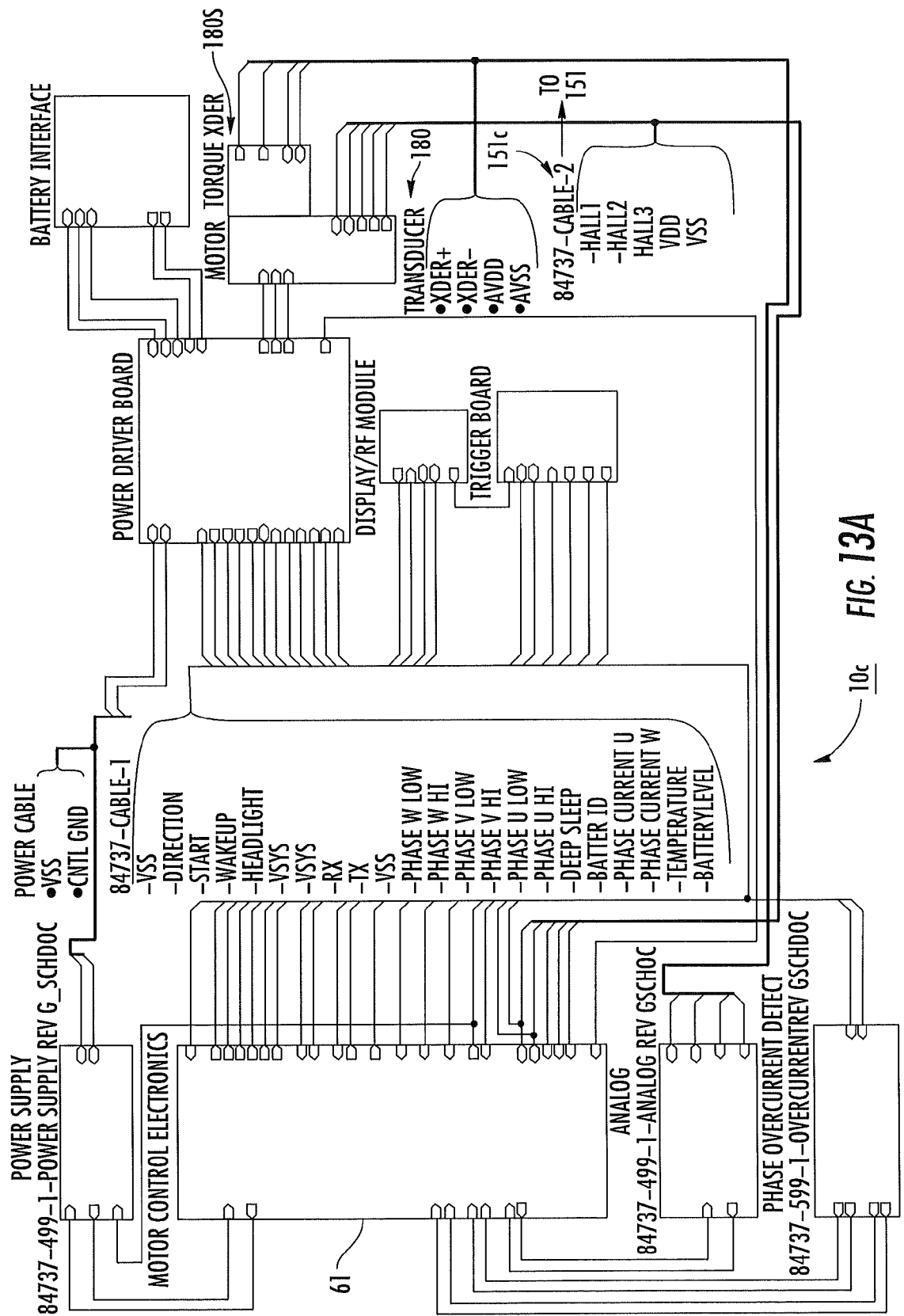
FIG. 13A is a circuit diagram of an example of a top level power tool (e.g., nut runner) circuit according to some embodiments of the present invention.

FIG. 9 illustrates an example of a torque measurement circuit 210 that obtains torque signal data 180$s$ from the torque transducer 180 (FIGS. 2, 13A). The tool control circuit 10$c$ can be configured to directly measure torque using the torque data and dynamically control the motor output for precision fastening.

Figure 10:
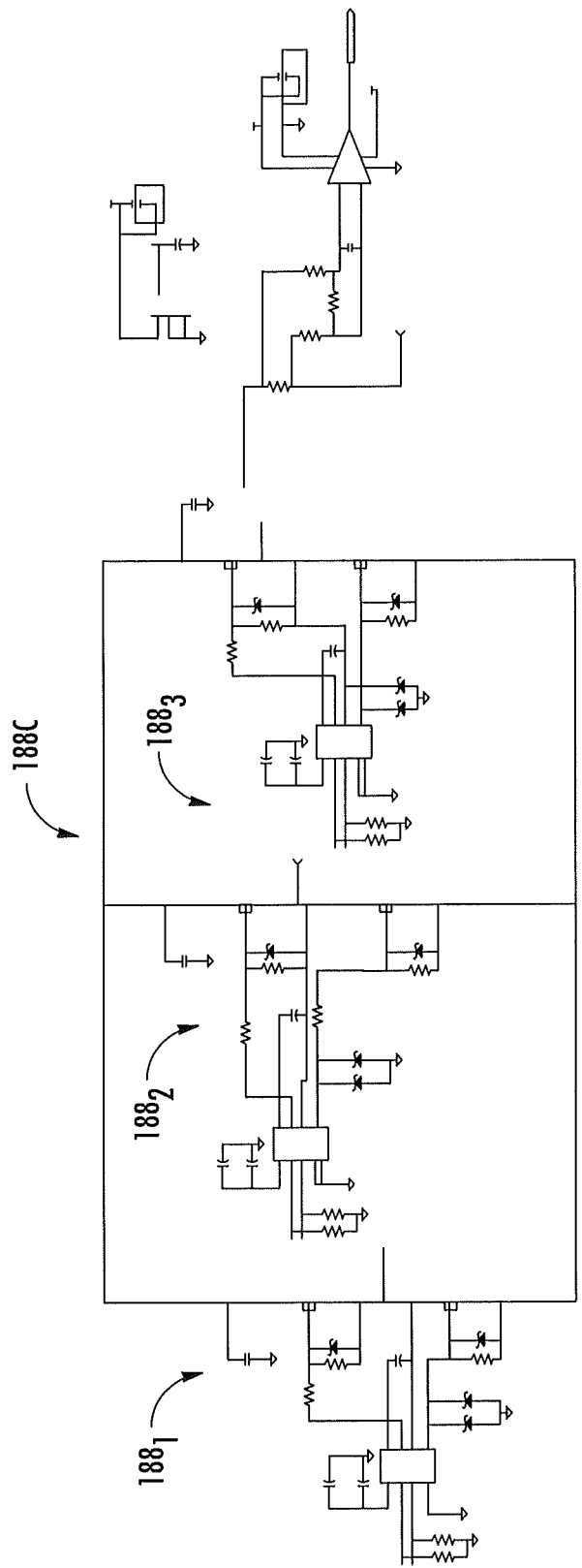
FIG. 10 is a diagram of an example of a motor drive circuit according to embodiments of the present invention.

FIG. 10 is an example of a motor drive circuit 188$c$. One of the failure modes of a push pull drive circuit 188$c$ (FIG. 10) is the opportunity for both switches (e.g., one $188_1$, $188_2$, $188_3$, FIG. 6A, 10) to be on at the same time (called "shoot through"), causing a direct short circuit and almost certain component failure. At the same time, the compact nature of the circuit 10$c$ and high powers being switched may induce voltages on any unprotected track. For protection, all switching devices 188 have a protective resistor such as a 10 KΩ pull down resistor connected between the gate and source. In addition, the switching devices 188 can also have safety turn-on resistor, such as a 10 KΩ resistor, that can be connected between ground and the input to each gate driver to further insure that the switching devices will not turn on by induced voltages. As a third level of protection, the switching circuits may include a noise turn-on resistor, such as 1 KΩ of resistance, which can be placed in series with each gate driver input to limit the chance that a stray noise event will turn on a switch in the event of a cable failure. This resistance can be divided substantially equally between the power board 50 and the processor (e.g., DSP) board 60.

In some embodiments, high speed braking is provided to achieve a precision torque capability. However, this can produce a regenerative voltage transient (motor acting as a generator) on top of the battery voltage. If left unchecked, these transients can exceed twice the battery voltage. Transients of this magnitude risk causing electrical overstress failure to all components on the supply bus. Thus, a transient voltage suppressor can be placed across the battery terminals to clamp the supply voltage to a safe level.

Figure 12:
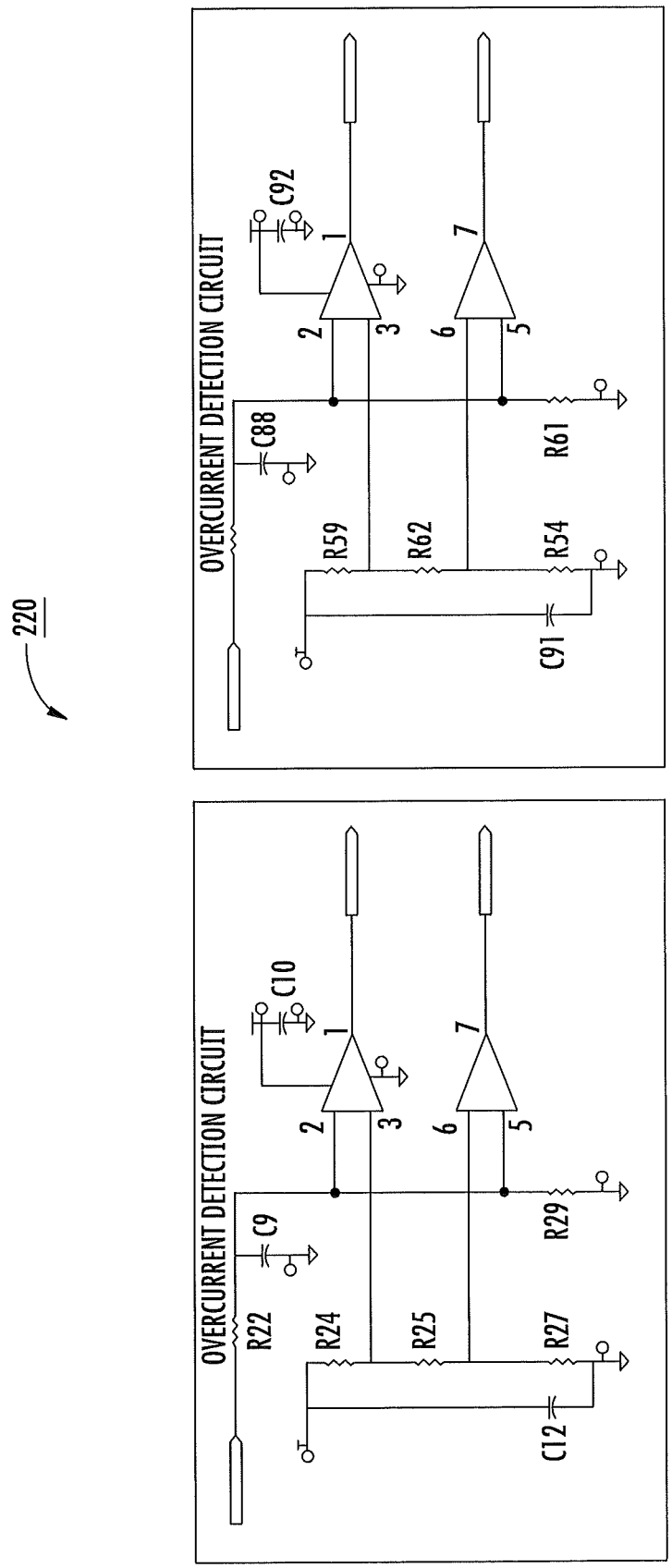
FIG. 12 is a diagram of an example of an overcurrent detection circuit according to some embodiments of the present invention.

Overcurrent protection can be provided by an overcurrent detection circuit 220 (FIG. 12) that includes a pair of dual comparators. These devices look at the scaled current magnitude, both positive and negative, and compare it to a preprogrammed value. Their outputs drive Trip Zone inputs on the digital signal processor 61 on the processor board 60. The trip or threshold value can be set by a resistor network. When the scaled current crosses the preprogrammed threshold the output of the comparator is driven to a logic zero causing the corresponding motor PWM signal will skip a cycle. This Cycle Skipping reduces the current demand by forcing the motor to coast when excessive current begins to be drawn from the battery. The PWM resumes normal operation after the overcurrent condition has been relieved. Such a design allows for handling overcurrent events safely during an active fastening without terminating the fastening.

As noted above, the power tool 10 can include five separate circuit boards placed within the tool's housing, further description of each board is provided below.

The precision wireless tool can selectively operate with (a) angle control with torque monitoring or (b) torque control with angle monitoring.

Figure 13B:
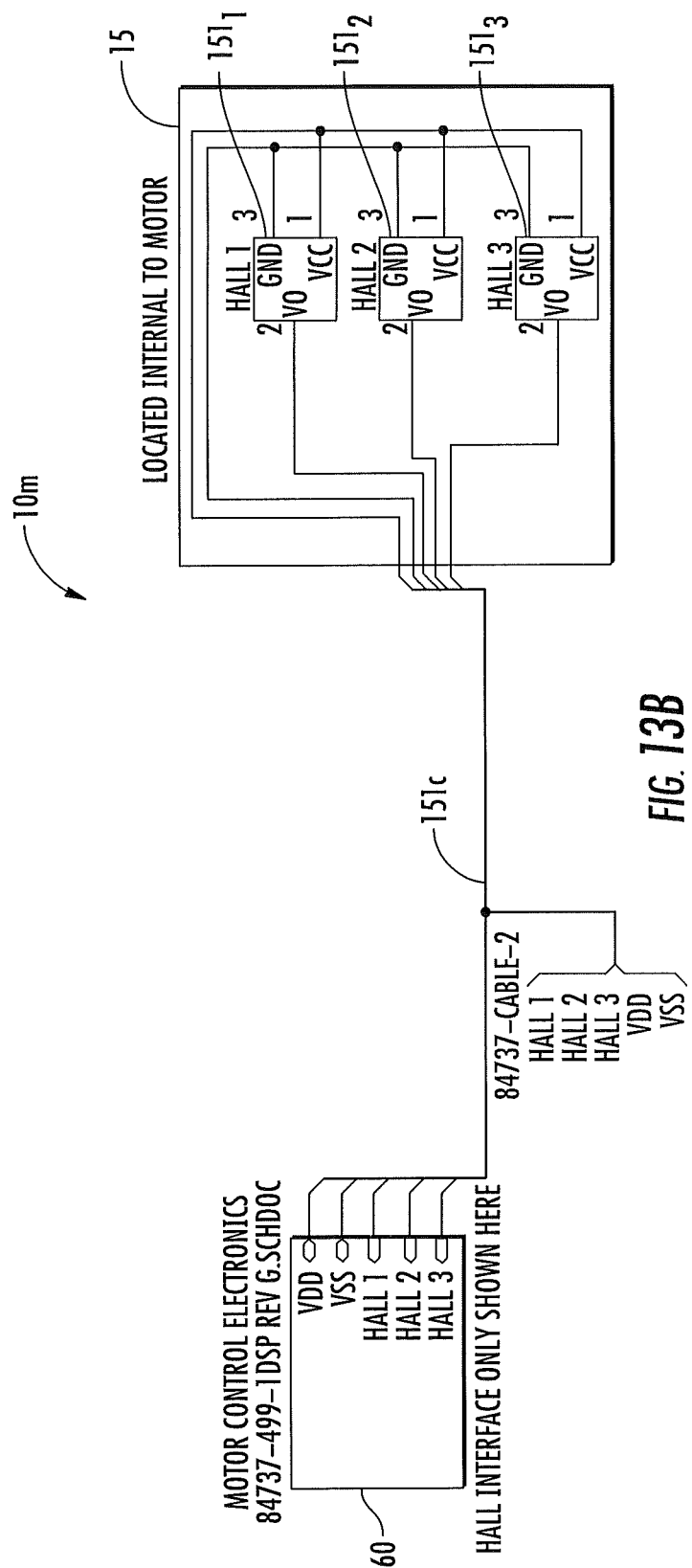
FIG. 13B is a circuit diagram of a motor control circuit with hall sensors according to embodiments of the present invention.

As discussed with respect to FIG. 2 above, in some embodiments, the tool 10 can comprise at least one Hall based position sensor 151 for angle monitoring and/or positioning. FIG. 13A illustrates hall sensor input cable 151c as 84737-cable-2. This cable 151c can provide the signal path for the hall position sensors from the motor 15, where the Hall Position Sensors 151 are mounted internally, to the motor control electronics board, which is typically the DSP Board 60. FIG. 13B shows an exemplary motor control circuit 10m with the hall sensors 151 in the motor 15 with a cable 151c connecting to the DSP 60 (shown only with the hall-based motor control circuit components).

The power board 50 is typically separate from all digital circuits to minimize high current switching noise from effecting sensitive circuits. The power board 50 contains the motor drive circuits 188c (FIG. 10) including the Power MOSFETS and Gate Drivers for each of the three phases, a 5 Volt power supply that powers all of the boards inside the tool and a 12V boost supply for the Gate Drivers. The power supplies can be small and efficient, switching at higher frequencies therefore using smaller size inductors. There can be additional circuits that monitor battery signals and control signals from the processor board 60 to shut down the power supplies and improve or maximize battery life and minimize or reduce battery discharge rates.

The processor (DSP) board 60 contains the motor control DSP 61, motor position analog circuits, phase current sensing circuits, torque signal circuits, and the DSP's power supplies. The position of the processor board 60 keeps it far enough away from the power board's high switching signals from the switches 188 and the tool's motor 15. The position also allows the handle of the tool to be the conduit for all of the signal wires 12 that connect to the processor board 60. FIG. 13A is a top level diagram of an example of components of the power tool circuit 10c.

Figure 11:
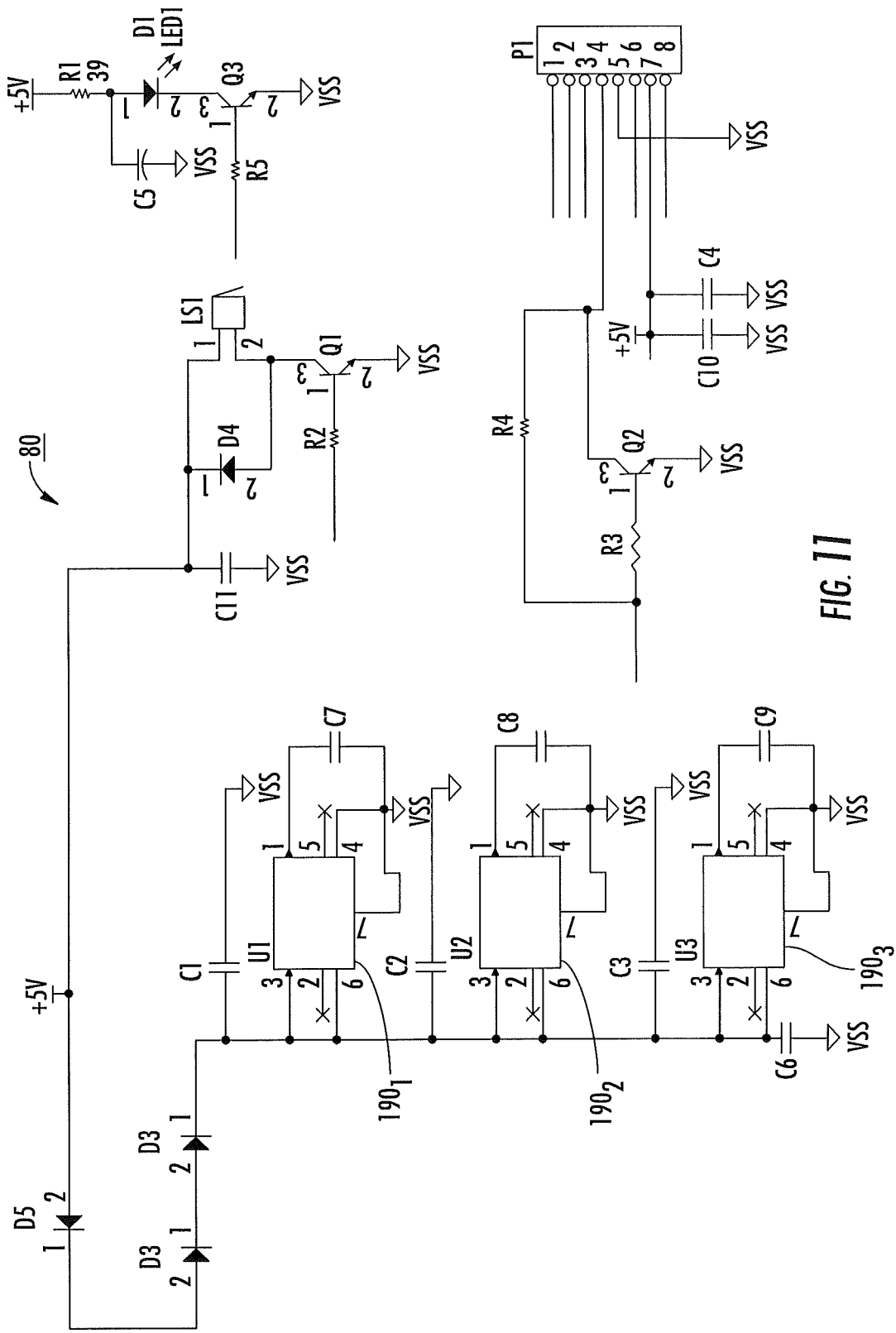
FIG. 11 is a diagram of an example of a trigger board according to some embodiments of the present invention.

The trigger board 80 can be located above and substantially parallel to the tool's trigger 11. As shown in FIG. 11, the trigger board 80 typically contains three hall-effect devices 190 that monitor the trigger's position: half pulled $190_2$=wake-up/headlight on, and fully pulled $190_3$=motor run. The third hall-effect $190_1$ is used for motor direction determined by the position of a slide switch. The trigger board 80 also contains a speaker for alerting the operator of an event, and the tool's head-light LED for illuminating the work area around the fastener.

Figure 18:
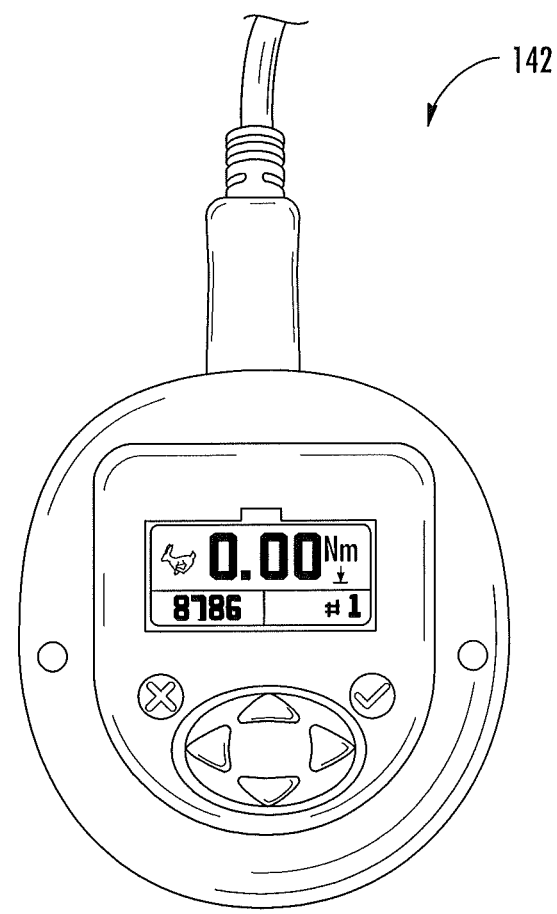
FIG. 18 is a top view of a control input accessory with a display and user interface that can be used to adjust parameters of a tool and/or communicate with the tool according to embodiments of the present invention.

The display board 70 is typically located at the back of the tool facing the operator when in use. The display board 70 can be the tool interface to the outside world. It has an OLED display for viewing end of run tightening data, set-up configurations, diagnostics and fault codes. See, e.g., PCT/US2011/030653, the contents of which are hereby incorporated by reference as if recited in full herein. The UI can include a key pad, such as a button key pad, that allows the user to scroll through the on screen menus, set up tightening strategies, and read back end of run data. There can be four LEDs on the board, YELLOW, GREEN, RED, and BLUE that illuminate through LED pipes in the housing of the tool. These LED's give the operator a quick view of the tool's status and tightening outcome. The tool's USB port can be configured for uploading up to 1000 fastening operations and for configuring the tool. The USB port can be located at the top of the tool. The USB port 10p can also be used to download new software versions, keeping the tool up to date with latest features. The tool 10 can cooperate with a remote and/or accessory computer such as a GUI input accessory device 142 (FIG. 18) either wirelessly and/or via hardwired cords to define operational parameters, transfer data or otherwise communicate.

The display 40 can be configured to present defined icons associated with different selectable settings to allow a user to be able to select operational parameters including a soft or hard joint configuration and angle or torque monitoring, fast or slow operation (e.g., a rabbit for free speed), up and down arrows for high and low torque limits and high and low angle limits, tightening control type (target angle or torque) and the like as shown, for example, in FIGS. 17A-17D.

The radio board 75 (also known as the RF carrier board) can be "piggy-backed" to the display board 70, the radio board holds a Radio Module such as, for example, an 802.15.4 Radio Module. The Radio Module wirelessly communicates end of run data out of the tool 10, and configuration data into the tool via an external device 90 (FIG. 2). The external device 90 can communicate with several tools and can be termed a Process Control Module or Multi Tool Module. The Radio Module can optionally include a built-in antenna that is directly on the radio board 75, eliminating the need for an external antenna. The data between the tool and the Radio Module can be processed in the display board's microprocessor.

Figure 14:
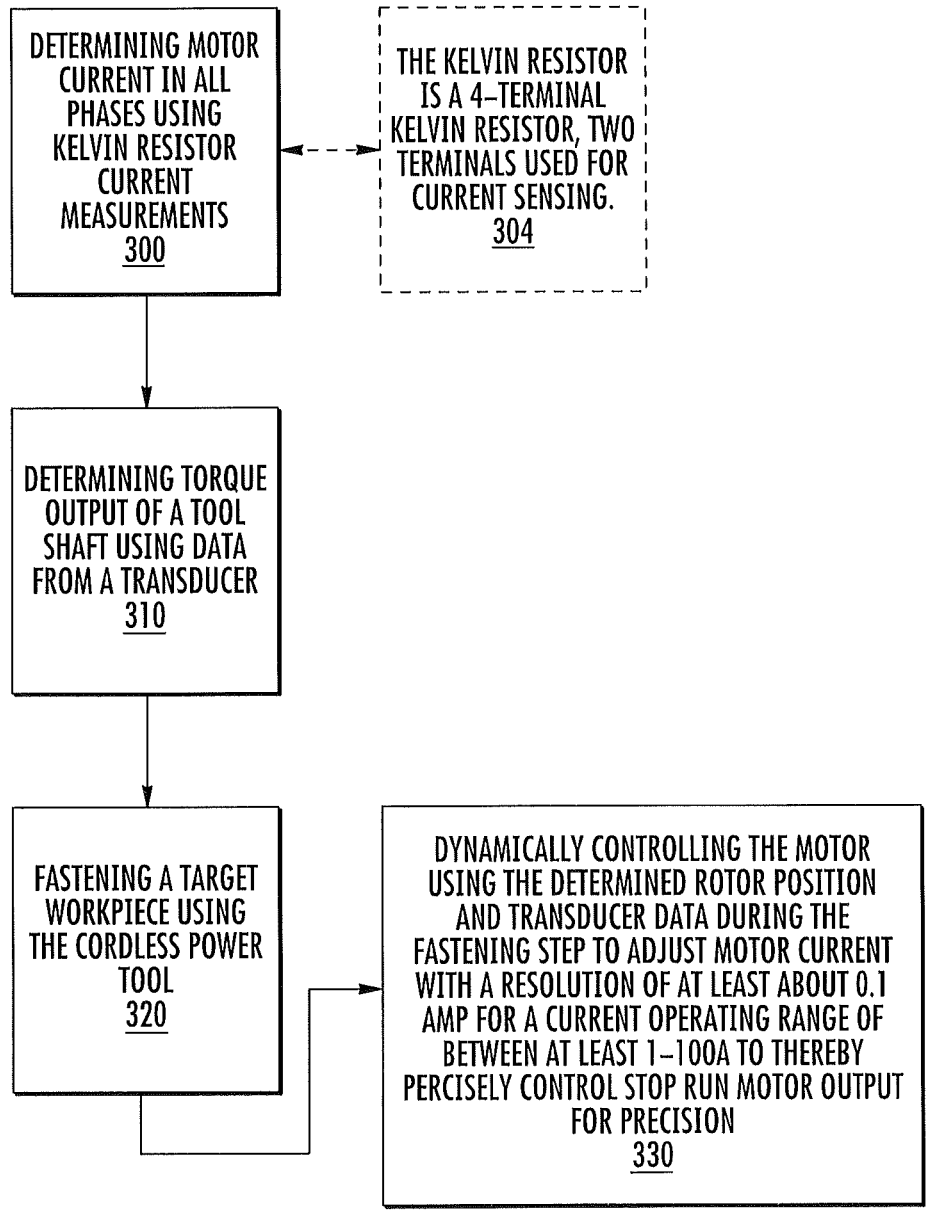
FIG. 14 is a flow chart of examples of operations that can be used to control a cordless power tool according to embodiments of the present invention.

FIG. 14 illustrates exemplary operations that can be carried out by the cordless power tool according to embodiments of the present invention. Motor current can be determined in all phases using a Kelvin resistor for current measurement (block 300). Two terminals of the four terminals of the Kelvin resistor can be used for current sensing (block 304).

Torque output of a tool shaft can be determined using data from a transducer (block 310). A target work piece can be fastened to a defined torque using the cordless power tool (block 320). The motor is dynamically controlled using the determined rotor position and transducer data during the fastening step to adjust motor current with a resolution of at least about 0.1 A, for a current operating range of between at least 1 A to 100 A to thereby precisely control stop run motor output for precision fastening (block 330).

Embodiments of the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

Figure 15:
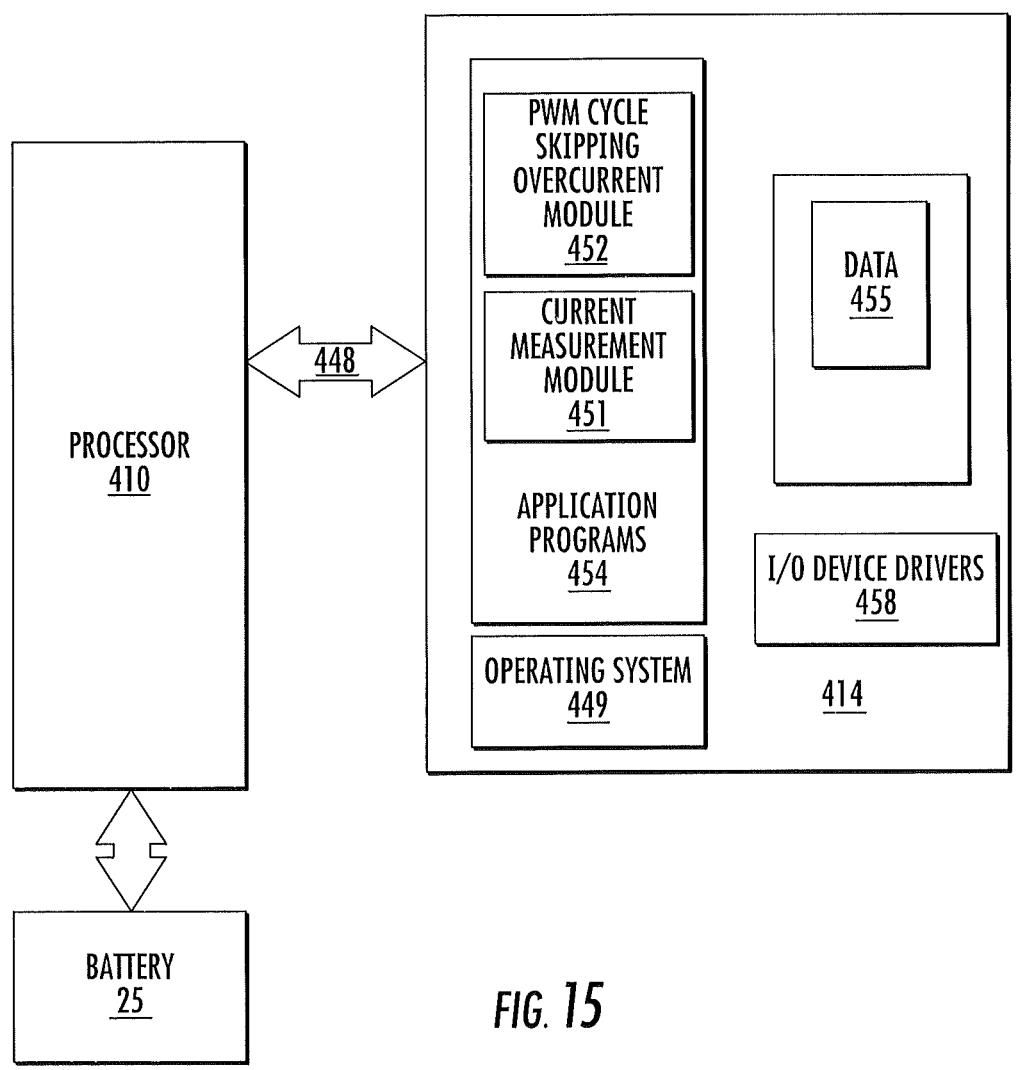
FIG. 15 is a data processing system according to embodiments of the present invention.

FIG. 15 is a block illustration of a circuit or data processing system that can be used with the power tool control circuit 10c of the cordless power tool 10. The circuits and/or data processing systems may be incorporated in one or more digital signal processors. As shown in FIG. 15, the at least one processor 410 is held in the cordless power tool and includes memory 414 that communicates with the processor via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM, FIG. 15 illustrates that the memory 414 may include several categories of software and data used in the data processing system: the operating system 449; the application programs 454; the input/output (I/O) device drivers 458; and data 455. The data 456 can include device (tool-specific) operational controls or limits for each tool. FIG. 15 also illustrates the application programs 454 can include a Current Measurement Module 452, and a PWM Cycle Skipping Overcurrent Module 451.

As will be appreciated by those of skill in the art, the operating systems 449 may be any operating system suitable for use with a data processing system, such as OS/2, AIX, or zOS from International Business Machines Corporation, Armonk, N.Y., Windows CE, Windows NT, Windows95, Windows98, Windows2000, WindowsXP, Windows Visa, Windows7, Windows CE or other Windows versions from Microsoft Corporation, Redmond, Wash., Palm OS, Symbian OS, Cisco IOS, VxWorks, Unix or Linux, Mac OS from Apple Computer, LabView, or proprietary operating systems.

The I/O device drivers 458 typically include software routines accessed through the operating system 449 by the application programs 454 to communicate with devices such as I/O data port(s), data storage 456 and certain memory 414 components. The application programs 454 are illustrative of the programs that implement the various features of the data processing system and can include at least one application, which supports operations according to embodiments of the present invention. Finally, the data 455 represents the static and dynamic data used by the application programs 454, the operating system 449, the I/O device drivers 458, and other software programs that may reside in the memory 414.

While the present invention is illustrated, for example, with reference to the Modules 451, 452 being application programs in FIG. 15, as will be appreciated by those of skill in the art, other configurations may also be utilized while still benefiting from the teachings of the present invention. For example, the Modules and/or may also be incorporated into the operating system 449, the I/O device drivers 458 or other such logical division of the data processing system. Thus, the present invention should not be construed as limited to the configuration of FIG. 15 which is intended to encompass any configuration capable of carrying out the operations described herein. Further, one or more of modules, i.e., Modules 451, 452 can communicate with or be incorporated totally or partially in other components, such as separate or a single processor or different circuits in the housing of the tool.

The I/O device drivers typically include software routines accessed through the operating system by the application programs to communicate with devices such as I/O data port (s), data storage and certain memory components. The application programs are illustrative of the programs that implement the various features of the data processing system and can include at least one application, which supports operations according to embodiments of the present invention. The data represents the static and dynamic data used by the application programs, the operating system, the I/O device driver and the like.

In some embodiments, the display or remote computer display can be used to define the wireless tool operational configuration thereby allowing a single tool to perform the function of several different conventional tools.

In some embodiments, the tool OLED display dims n % of max brightness after elapse of 'm' seconds at the end of a fastening cycle. Benefits: increase # of cycles per battery charge & extend life of OLED display module.

In some embodiments, PWM can be used to control brightness of status LEDs in order to preserve battery power and increase # of cycles per battery charge & extend life of LEDs. Also, adds comfort factor for eyes.

In some embodiments, electronic ID pairing of tools can be made with Controller PCM. This makes tool inoperable outside the range of Controller PCM for anti-theft purpose. This also ensures that tools are used in the designated location within a manufacturing facility.

In some embodiments, OLED displays can be used which offers low energy usage, bright crisp screen data and wide viewing angle for easy viewing in an industrial environment.

In some embodiments, a white colored text on a grey background can be used on a Tool display screen for error conditions to draw operator's attention. The text color can be reversed for all other display modes.

In some embodiments, an accelerometer or motion detector can be placed in the tool to "wake up" or put the tool in "sleep mode" for energy savings and improve performance in terms of response time.

In some embodiments, a strain gauge can be placed in the tool handle to help with altering motor control algorithm to enhance ergonomics and control.

In some embodiments, a touch sensor can be integrated into or on the tool display for biometric input, e.g., as a finger print scanner for security and/or ID purposes.

In some embodiments, separate status LEDs for system ready, ethernet and wireless communications can be placed on Controller PCM.

In some embodiments, unique identifiers, e.g., identification of tool by location ID in a facility can be implemented.

The controller PCM can process tool data from more than 1 tool.

The PLC can be configured to select fastening programs/ configurations on the tool in a closed loop process control setup.

In case a host PC application is not connected to the Controller PCM due to ethernet issues, the PCM controller can continue to record fastening cycles on the local flash from all tools. When the PC application reconnects all data from the Controller PCM can be extracted and stored by the PC application in the database for archiving and permanent record keeping.

The tools can include, tool to tool communication to preserve and transmit critical data in case Controller PCM is down.

Other optional features include one or more of the following features.

A channel hopping feature to find quite channels and switch to them real-time, intermediate sleep modes on motor controller DSP to preserve battery power.

Controller PCM has provision for one or more of the following communication protocols:
TCP/IP to receive barcode scanned data
TCP/IP to transmit fastening data
Serial RS-232 to receive barcode data
Serial RS-232 to transmit fastening data
Ethernet-IP support
Profibus support
Devicenet support
Modbus RTU support
Interbus-S support
Modbus TCP support
Profinet support Tools not yet configured for channel hopping can have their channel hopping configuration initialized subsequently by the PCM which does have channel hopping enabled. This simplifies the initial setup of channel hopping The PCM can carry out an energy scan periodically to sense the best channels to hop to when the need arises. The need to hop channels can be determined by the percentage of tools connecting through the primary radio versus the secondary radio. In some embodiments, the tool(s) or system can hop when more tools connect to the PCM's secondary radio that the primary radio. Tools may initially connect to the PCM's primary or secondary radio as they are turned on. The PCM can notify all the tools through a broadcast message when it is time to hop channels.

In some embodiments, tools that do not connect to a PCM right away can search for their PCM on each allowed RF channel and update connection data automatically when the connection is found.

In some embodiments, customers may limit the set of channels used by the radio to improve discovery times and limit noise pollution of other possible radio networks.

In some embodiments, there can be two (or more) individual, independent, radio modules, each with its own antenna on Controller PCM. Each antenna on Controller PCM can be positioned on-site for best view of the work cell.

The electric motor can be a brushless electric motor.

The precision wireless tool can selectively operate with (a) angle control with torque monitoring or (b) torque control with angle monitoring.

Embodiments of the invention can comprise a Hall based position sensor for angle positioning.

Embodiments of the invention can include optimal venting locations of the tool housing.

Embodiments of the invention operate with three different low torque modes, including about 4 Nm, about 8 Nm and about 12 Nm.

In some embodiments, the drive spindle can include a thrust bearing and an output spindle decoupled from gearing and the transducer, and load and shock can be substantially (if not totally) absorbed through the housing, not the transducer.

Embodiments of the invention provide computer program products for a cordless fastening power tool having a motor. The computer program product includes a non-transitory computer readable storage medium having computer readable program code embodied in the medium. The computer-readable program code including (a) computer readable program code configured to measure motor current using a Kelvin resistor held in the power tool; (b) computer readable program code configured to determine torque output of the power tool based on torque data from an onboard transducer; and (c) computer readable program code configured to dynamically control the motor using the measured motor current and transducer torque data during a fastening operation to adjust motor current with a resolution of at least about 0.1 A for a current operating range of between at least 1-100 A to thereby precisely control stop and run motor output for precision fastening.

Embodiments of the invention can encompass devices represented by one or more of the following claims.

1. A hand-held cordless fastening power tool, comprising:
a housing;
a motor residing in the housing, the motor having a rotor that drives an output shaft;
a torque transducer in the housing in communication with the output shaft;
a dynamic motor control circuit residing in the housing in communication with the motor and torque transducer, the dynamic motor control circuit comprising a Kelvin resistor in communication with the motor for measuring motor current; and
an onboard display held by the housing in communication with an onboard externally accessible User Interface with at least one input button residing proximate to the display, wherein the display presents defined icons associated with different selectable settings to allow a user to be able to select operational parameters including a soft or hard joint configuration and angle or torque monitoring.

2. A hand-held cordless fastening power tool, comprising:
a housing having a pistol shape with an upper portion that merges into a downwardly extending handle;
a motor residing in the upper part of the housing, the motor having a rotor that drives an output shaft;
a torque transducer in the housing in communication with the output shaft;
a dynamic motor control circuit residing in the housing in communication with the motor and torque transducer, the dynamic motor control circuit comprising a Kelvin resistor in communication with the motor for measuring motor current and digital hall switches in communication with the motor for measuring motor speed; and
an onboard display held by the housing in communication with an onboard externally accessible User Interface residing proximate to the display to allow a user to be able to select one of a plurality of different defined tool configurations and a target torque value.

3. The power tool of claim 1 or claim 2, wherein the onboard display and User Interface reside on an end portion of the upper part of the housing, facing away from the output shaft, and wherein the User Interface includes at least one elastomeric input selection button, and wherein the tool further comprises a USB input port held by the housing.

4. The power tool of any of the foregoing claims, wherein the onboard display presents a series of visual input options with defined icons that allow a user to select, deselect and adjust different defined parameters including torque angle and torque speed.

5. The power tool of any of the foregoing claims, wherein the User Interface has a plurality of spaced apart elastomeric input buttons, including a directional navigation pad and select and deselect buttons.

6. A hand-held cordless fastening power tool, comprising:
a housing having a pistol shape with an upper portion that merges into a downwardly extending handle;
a motor residing in the upper part of the housing, the motor having a rotor that drives an output shaft;
a torque transducer in the housing in communication with the output shaft;
a dynamic motor control circuit residing in the housing in communication with the motor and torque transducer, the dynamic motor control circuit comprising a Kelvin resistor in communication with the motor for measuring motor current and digital hall switches in communication with the motor for measuring motor speed; and
an onboard display held by the housing in communication with an onboard externally accessible User Interface residing proximate to the display to allow a user to be able to select one of a plurality of different defined tool configurations and a target torque value.

7. The power tool of any of the foregoing claims, wherein the onboard display and User Interface reside on an end portion of the upper part of the housing, facing away from the output shaft, and wherein the User Interface includes at least one elastomeric input selection button, and wherein the tool further comprises a USB input port held by the housing.

8. The power tool of any of the foregoing claims, wherein the onboard display presents a series of visual input options with defined icons that allow a user to select, deselect and adjust different defined parameters including torque angle and torque speed.

9. The power tool of claim 1, wherein the User Interface has a plurality of spaced apart elastomeric input buttons, including a directional navigation pad and select and deselect buttons.

10. The cordless power tool of any of the foregoing claims, wherein the motor control circuit comprises:
a trigger circuit board residing horizontally under the motor in the upper part of the housing;
a processor circuit board residing horizontally in a lower portion of the handle proximate a battery in communication with the trigger circuit; and
a power circuit board residing between the trigger circuit board and the processor circuit board and extending upwardly therebetween, the power circuit board in communication with the processor circuit, wherein the power circuit board has a length that is greater than a major portion of a length of the handle.

11. The cordless power tool of any of the foregoing claims, wherein the motor control circuit comprises a power circuit board residing in the handle, wherein the power circuit board has a length that is greater than a major portion of a length of the handle, wherein the power circuit board comprises motor drive circuits; and wherein the housing comprises a cooling air flow path that comprises a plurality of spaced apart air intakes proximate the bottom of the handle, the air flow path configured to direct air to flow over the power circuit board to a top portion of the tool before exhausting out of the housing.

12. The cordless power tool of any of the foregoing claims, wherein the dynamic motor control circuit is a closed loop control circuit held in the housing to provide precise torque output, wherein the closed loop motor control circuit comprises a small current measurement resistor in electrical communication with the Kelvin resistor to determine a precise motor current in all phases, wherein the closed loop control circuit comprises a power circuit board in communication with the motor, the power circuit board having switching devices, and wherein the motor has a dynamic range of between about −150 A to about +150 A and the closed loop control circuit can control the motor current to a resolution of at least about 0.1 A.

13. The cordless power tool of any of the foregoing claims, wherein the housing has a pistol shape with an upper portion that merges into a downwardly extending handle, wherein the power tool is a precision-fastening power tool, wherein the motor control circuit includes an elongate power circuit board that has a height that is substantially the same as a length of the handle with a lower portion that comprises a battery interface, wherein the power circuit board comprises first and second primary surfaces that reside upright in the handle portion with longitudinally spaced apart integral metallic heat sinks on each of the first and second primary surfaces, with switching elements for respective switching devices mounted on top of each heat sink directly across from each other.

14. The cordless power tool of any of the foregoing claims, wherein the motor control circuit includes a processor board, a trigger board, a power board, a display board and an RF carrier board, all in the housing, wherein the processor board resides at a bottom portion of the handle between the power board and a releasable battery pack, wherein the processor board comprises a motor control digital signal processor, motor position analog circuits, phase current sensing circuits, torque signal circuits, and power supply, wherein the display board resides at a back end portion of the upper portion of the housing and is in communication with the display, wherein the RF carrier board is positioned adjacent the display board for wireless fastening data transmission.

15. A hand-held cordless fastening power tool, comprising:
a housing;
a motor residing in the housing, the motor having a rotor that drives an output shaft;
a torque transducer in the housing in communication with the output shaft;
a plurality of hall sensors residing internal to the motor;
a dynamic motor control circuit residing in the housing in communication with the motor, the hall sensors and the torque transducer; and
an onboard display held by the housing in communication with an onboard externally accessible User Interface with at least one input button residing proximate to the display, wherein the display presents defined icons associated with different selectable settings to allow a user to be able to select operational parameters.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, if used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A hand-held cordless fastening power tool, comprising:
a housing;
a motor residing in the housing, the motor having a rotor that drives an output shaft;
a torque transducer electronically communicating with the output shaft and positioned in the housing; and
a dynamic motor control circuit electronically communicating with the motor and the torque transducer, wherein the dynamic motor control circuit is positioned in the housing, the dynamic motor control circuit comprising
a Kelvin resistor electronically communicating with the motor for measuring motor current and
digital hall switches electronically communicating with the motor for measuring motor speed,
wherein the motor current can vary by at least 100 A during operation, and
wherein the motor is dynamically controlled during operation based on the motor current measured by the Kelvin resistor and torque data from the torque transducer.

2. The cordless power tool of claim 1, further comprising:
a rechargeable battery pack releasably attached to the lower portion of the power tool, wherein the battery pack is a low voltage battery pack of about 36V or less; and
a plurality of hall sensors held internal to the motor in electronic communication with the dynamic motor control circuit to allow for at least one of angle monitoring or angle positioning.

3. The cordless power tool of claim 1, wherein the Kelvin resistor comprises four terminals, two used for current sensing and two used as a current path, and wherein the dynamic motor control circuit is configured to run the motor using current that is between about 150 A to about −150 A.

4. The cordless power tool of claim 1, wherein the housing has a pistol shape with an upper portion that merges into a downwardly extending handle, the tool further comprising a power circuit board residing in the handle, the power circuit board holding the Kelvin resistor, the power circuit board further comprising at least one high gain differential current amplifier and a plurality of low-inductance 3-node capacitors mounted on the power circuit board.

5. The cordless power tool of claim 1, wherein the housing has a pistol shape with an upper portion that merges into a downwardly extending handle, and wherein the motor control circuit comprises:
a trigger circuit board residing under the motor in the upper portion of the housing;
a processor circuit board residing in a lower portion of the handle in electronic communication with the trigger circuit; and
a power circuit board residing between the trigger circuit board and the processor circuit board in electronic communication with the processor circuit, wherein the power circuit board has a length that is greater than a major portion of a length of the handle, wherein the power circuit board comprises a plurality of spaced apart integral heat sinks residing on both primary surfaces of the power circuit board, each integral heat sink comprising a volume of a thermally conductive material in a respective defined fill area of the circuit.

6. The cordless power tool of claim 5, further comprising switching devices in electronic communication with the motor, the switching devices comprising switching elements that are mounted directly across from each other on opposing primary surfaces of the power circuit board to thereby reduce radiated emissions and/or generated heat.

7. The cordless power tool of claim 1, wherein the housing has a pistol shape with an upper portion that merges into a downwardly extending handle, wherein the motor control circuit comprises a power circuit board residing in the handle, wherein the power circuit board has a length that is greater than a major portion of a length of the handle, wherein the power circuit board comprises motor drive circuits; and wherein the housing comprises a cooling air flow path that comprises at least one air intake proximate the bottom of the handle, the air flow path configured to direct air to flow over the power circuit board to a top portion of the tool before exhausting out of the housing via exhaust ports on the upper portion of the housing.

8. The cordless power tool of claim 1, wherein the housing has a pistol shape with an upper portion that merges into a downwardly extending handle, wherein the motor control circuit includes a processor circuit board residing in a lower part of the handle in a substantially horizontal orientation substantially orthogonal to a power board, wherein wires from the processor circuit are routed proximate an inner surface of the handle housing wall over one primary surface of the power board to the upper portion of the housing.

9. The cordless power tool of claim 1, wherein the dynamic motor control circuit is a closed loop control circuit held in the housing to provide precise torque output, wherein the closed loop motor control circuit comprises a small current measurement resistor in electrical communication with the Kelvin resistor to determine a precise motor current in all phases, wherein the closed loop control circuit comprises a power circuit board in electronic communication with the motor, the power circuit board having switching devices, and wherein the motor has a dynamic range of between about −150 A to about +150 A and the closed loop control circuit can control the motor current to a resolution of at least about 0.1 A.

10. The cordless power tool of claim 1, wherein the housing has a pistol shape with an upper portion that merges into a downwardly extending handle, wherein the power tool is a precision-fastening power tool, wherein the motor control circuit includes an elongate power circuit board that has a height that is substantially the same as a length of the handle with a lower portion that comprises a battery interface, wherein the power circuit board comprises first and second primary surfaces that reside upright in the handle portion with longitudinally spaced apart integral metallic heat sinks on each of the first and second primary surfaces, with switching elements for respective switching devices mounted on top of each heat sink directly across from each other.

11. The cordless power tool of claim 10, wherein the power circuit board comprises high gain differential current amplifiers, and wherein the power circuit board comprises first and second power switch elements residing substantially directly across from each other on opposing primary sides of the power circuit board.

12. The cordless power tool of claim 1, wherein the motor control circuit includes a power circuit board that is separate from all digital circuits to thereby isolate or reduce current switching noise interaction with digital circuits, and wherein the power circuit board comprises motor drive circuits including power MOSFETs with gate drivers for each of three phases of the motor, a 5V power supply that powers all of the circuit boards inside the tool, and a 12V boost power supply for the gate drivers.

13. The cordless power tool of claim 1, wherein the housing has a pistol shape with an upper cylindrical portion that merges into a downwardly extending handle, wherein the motor control circuit includes a processor board, a trigger board, a power board, a display board and an RF carrier board, all in the housing, wherein the processor board resides at a bottom portion of the handle between the power board and a releasable battery pack, wherein the processor board comprises a motor control digital signal processor, motor position analog circuits, phase current sensing circuits, torque signal circuits, and power supply, wherein the display board resides at a back end portion of the cylindrical upper portion of the housing and is in communication with an externally visible display having a keypad User Interface, wherein the RF carrier board is positioned adjacent the display board and for wireless fastening data transmission.

14. The cordless power tool of claim 1, further comprising an overcurrent protection circuit in the housing, the overcurrent circuit comprising a pair of dual comparators that monitor scaled current magnitude, positive and negative, wherein the overcurrent circuit compares the monitored scaled current to a predetermined trip value and is configured to cause a motor pulse width modulated (PWM) signal to skip a cycle to reduce current demand when the monitored scaled current is at or exceeds the predetermined tip value, then allowing the PWM signal to resume normal operation after the overcurrent condition alleviates to thereby avoid overcurrent conditions during an active fastening operation without terminating the fastening.

15. A method of operating a precision-fastening cordless power tool, comprising:
providing a cordless, hand-held power tool having a motor and a rechargeable battery power supply;
measuring motor current of the motor using a Kelvin resistor housed in the power tool and electronically coupled to the motor;
determining torque output of the power tool based on torque data from an onboard transducer electronically coupled to the motor;
fastening a target work piece to a defined torque using the cordless power tool; and
dynamically controlling the motor using the measured motor current from the Kelvin resistor and transducer torque data during the fastening step to adjust motor current with a resolution of at least about 0.1 A for a current operating range of between at least 1-100 A to thereby precisely control stop and run motor output for precision fastening.

16. The method of claim 15, wherein the current operational range is between about 150 A to about 150 A.

17. The method of claim 15, further comprising storing fastening values associated with at least 100 separate fastening operations, then wirelessly relaying the fastening values to a remote device.

18. The method of claim 15, further comprising dissipating heat from power switches on a power board in a handle of the power tool using copper filled areas on the power circuit board.

19. The method of claim 15, further comprising monitoring for overcurrent situations using dual comparators that monitor scaled current magnitude, positive and negative, and comparing the monitored scaled current to a predetermined trip value to cause a motor pulse width modulated (PWM) signal to skip a cycle to reduce current demand when the monitored scaled current is at or exceeds the predetermined tip value, then allowing the PWM signal to resume normal operation after the overcurrent condition alleviates to thereby avoid overcurrent conditions during an active fastening operation without terminating the fastening.

20. A hand-held cordless fastening power tool, comprising:
a housing;
a motor residing in the housing, the motor having a rotor that drives an output shaft;
a torque transducer electronically communicating with the output shaft and positioned in the housing;
a dynamic motor control circuit electronically communicating with the motor and the torque transducer, wherein the dynamic motor control circuit is positioned in the housing, the dynamic motor control circuit comprising a Kelvin resistor electronically communicating with the motor for measuring motor current, wherein the motor is dynamically controlled during operation based on the motor current measured by the Kelvin resistor and torque data from the torque transducer; and
an onboard display held by the housing in communication with an onboard externally accessible User Interface with at least one input button residing proximate to the display, wherein the display presents defined icons associated with different selectable settings to allow a user to be able to select operational parameters including a soft or hard joint configuration and angle or torque monitoring.

* * * * *